(12) United States Patent
Han et al.

(10) Patent No.: US 12,398,904 B2
(45) Date of Patent: Aug. 26, 2025

(54) AIR CONDITIONER AND METHOD FOR CONTROLLING SAME BASED ON INDOOR SPACE IMAGE INCLUDING RELATIVE POSITIONS OF WALLS, CEILING, AND FLOOR

(71) Applicant: LG ELECTRONICS INC., Seoul (KR)

(72) Inventors: Dongwoo Han, Seoul (KR); Yeon Kyung Chae, Seoul (KR); Taeyup Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 376 days.

(21) Appl. No.: 17/788,124

(22) PCT Filed: Dec. 23, 2020

(86) PCT No.: PCT/KR2020/019011
§ 371 (c)(1),
(2) Date: Jun. 22, 2022

(87) PCT Pub. No.: WO2021/133064
PCT Pub. Date: Jul. 1, 2021

(65) Prior Publication Data
US 2023/0030691 A1 Feb. 2, 2023

(30) Foreign Application Priority Data

Dec. 23, 2019 (KR) .................. 10-2019-0172944
Dec. 21, 2020 (KR) .................. 10-2020-0179643
Dec. 21, 2020 (KR) .................. 10-2020-0179644

(51) Int. Cl.
*F24F 11/63* (2018.01)
*G05B 19/042* (2006.01)

(52) U.S. Cl.
CPC ............ *F24F 11/63* (2018.01); *G05B 19/042* (2013.01); *G05B 2219/2614* (2013.01)

(58) Field of Classification Search
CPC .... F24F 11/63; F24F 2110/10; F24F 2130/00; F24F 11/79; F24F 11/74; F24F 11/30;
(Continued)

(56) References Cited

U.S. PATENT DOCUMENTS 10,657,376 B2  5/2020 Lee et al.
2006/0092575 A1* 5/2006 Mochizuki ............ G11B 5/265
(Continued)

FOREIGN PATENT DOCUMENTS

CN     101493246     7/2009
CN     204254762     4/2015
(Continued)

OTHER PUBLICATIONS

Manuja A, Ritchie J, Buch K, Wu Y, Eichler CM, Little JC, Marr LC. Total surface area in indoor environments. Environmental Science: Processes & Impacts. 2019;21(8):1384-92. (Year: 2019).*
(Continued)

*Primary Examiner* — Alicia M. Choi
(74) *Attorney, Agent, or Firm* — KED & ASSOCIATES, LLP

(57) ABSTRACT

Provided are an air conditioner and a control method thereof. The air conditioner may include a wind direction controller that changes the direction of air being discharged, an air volume controller that changes the amount of air being discharged, a camera that obtains an image of indoor space and provides an indoor space image, and a control unit that controls the wind direction controller and the air volume controller, wherein the control unit finds indoor space information based on the indoor space image, and controls at
(Continued)

least one of the wind direction controller and the air volume controller based on the indoor space information.

20 Claims, 15 Drawing Sheets

(58) Field of Classification Search
CPC ..... F24F 1/0011; F24F 1/0014; G05B 19/042; G05B 2219/2614; G06T 7/12; Y02B 30/70
See application file for complete search history.

(56) References Cited

U.S. PATENT DOCUMENTS

| | | | |
|---|---|---|---|
| 2010/0186357 A1* | 7/2010 | Takeda | F24F 8/10 |
| | | | 55/471 |
| 2015/0093984 A1* | 4/2015 | Helt | F24F 11/46 |
| | | | 454/256 |
| 2018/0142911 A1 | 5/2018 | Zhang et al. | |
| 2018/0209681 A1 | 7/2018 | Song et al. | |
| 2018/0268220 A1 | 9/2018 | Lee et al. | |
| 2020/0072605 A1* | 3/2020 | Breton | G01L 13/00 |
| 2020/0234051 A1 | 7/2020 | Lee et al. | |
| 2021/0356161 A1* | 11/2021 | Chen | G05B 19/042 |

FOREIGN PATENT DOCUMENTS

| | | | |
|---|---|---|---|
| CN | 108692362 | | 10/2018 |
| CN | 109073256 | | 12/2018 |
| CN | 209310130 | | 8/2019 |
| JP | S60-29540 | | 2/1985 |
| JP | H05-126394 | | 5/1993 |
| JP | H07-19572 | | 1/1995 |
| JP | 2001-355898 | | 12/2001 |
| JP | 2009139010 A | * | 6/2009 |
| JP | 2013-108671 | | 6/2013 |
| JP | 2015-048956 | | 3/2015 |
| JP | 2015-48956 A | * | 3/2015 |
| JP | 2015-052431 | | 3/2015 |
| JP | 2016-023833 | | 2/2016 |
| JP | 2017-203581 | | 11/2017 |
| KR | 20010060501 A | * | 7/2001 |
| KR | 10-0315780 | | 10/2002 |
| KR | 10-2009-0087366 | | 8/2009 |
| KR | 10-0969576 | | 7/2010 |
| KR | 2018-0071031 | | 6/2018 |
| KR | 10-2019-0026500 | | 3/2019 |
| KR | 20190026500 A | * | 3/2019 |
| KR | 10-2019-0092987 | | 8/2019 |
| KR | 10-2019-0128190 | | 11/2019 |
| KR | 10-2098687 | | 4/2020 |
| WO | WO 2015/063867 | | 5/2015 |
| WO | WO 2018/058132 | | 3/2018 |

OTHER PUBLICATIONS

International Search Report (with English Translation) dated Mar. 31, 2021 issued in PCT Application No. PCT/KR2020/019011.
RoomNet: End-to-End Room Layout Estimation (2017 ICCV).
Extended European Search Report dated Dec. 7, 2023 issued in Application No. 20904855.2.
Chinese Office Action dated Apr. 21, 2023 issued in Application No. 202080089763.1.
Japanese Office Action dated Aug. 15, 2023, issued in Application No. 2022-538401.
Korean Office Action dated Jan. 26, 2023 issued in Application No. 10-2021-0169109.
Korean Office Action dated May 1, 2025 issued in Application No. 10-2020-0179643.

* cited by examiner

AIR CONDITIONER AND METHOD FOR CONTROLLING SAME BASED ON INDOOR SPACE IMAGE INCLUDING RELATIVE POSITIONS OF WALLS, CEILING, AND FLOOR

CROSS-REFERENCE TO RELATED PATENT APPLICATIONS

This application is a U.S. National Stage Application under 35 U.S.C. § 371 of PCT Application No. PCT/KR2020/019011, filed Dec. 23, 2020, which claims priority to Korean Patent Application No. 10-2019-0172944, filed Dec. 23, 2019, and Korean Patent Application Nos. 10-2020-0179643 and 10-2020-0179644, both filed Dec. 21, 2020, whose entire disclosures are hereby incorporated by reference.

TECHNICAL FIELD

Disclosed herein are an air conditioner and a control method thereof.

BACKGROUND ART

Air conditioners can adjust the temperature and/or humidity of air in indoor space or purify air in indoor space, to create a pleasant environment in the indoor space. For example, air conditioners can discharge cold air or hot air to indoor space to adjust the temperature of the indoor space to a temperature desired by users. To this end, an air conditioner can be placed at any one position in the indoor space.

An air conditioner, disclosed in KR Patent No. 10-0315780, operates as a user turns on the air conditioner, and discharges air in a basic wind direction and/or a basic air volume. The basic air volume and/or the basic wind direction is set regardless of the structure, size and the like of indoor space where the air conditioner is installed.

In a method for controlling an air conditioner according to the document, the air conditioner operates in the same way using the control method without considering information on the structure, size and the like of the indoor space where the air conditioner is installed, causing deterioration in the operational efficiency of the air conditioner. That is, the temperature of the indoor space cannot reach a target temperature quickly, and temperature deviation occurs in the indoor space.

Additionally, since a temperature distribution rate decreases in the indoor space, a temperature sensor of the air conditioner fails to quickly sense a change in the temperature of the indoor space, causing overcooling and/or overheating and unnecessary power consumption.

Further, a method of estimating the structure of indoor space with camera image information is disclosed in KR Patent Publication No. 10-2019-0128190. In the method, angular points are detected in indoor space, the angular points are connected by lines, and then a structure formed by the lines is found among pre-stored structures. In the method according to the above document, the angular points of the indoor space can be detected, but when the structure formed by the lines is not in the pre-stored structures, the structure of the indoor space cannot be identified, and information on a distance to an angular point cannot be obtained. Furthermore, the above document presents the method of estimating the structure of indoor space only and does not present any details in relation to the application of the method.

DESCRIPTION OF INVENTION

Technical Problems

The present disclosure is directed to an air conditioner and/or a control method thereof that can adjust an indoor temperature to a target temperature within a shorter period of time.

The present disclosure is also directed to an air conditioner and/or a control method thereof that can increase a temperature distribution rate (a rate of an area the temperature of which is included in a target temperature range (e.g., a ±1° C. of a target temperature range), in the entire indoor space) of indoor space within a shorter period of time.

The present disclosure is also directed to an air conditioner and/or a control method thereof that can create a pleasant environment in indoor space within a shorter period of time.

The present disclosure is also directed to an air conditioner and/or a control method thereof that can obtain information on indoor space, and adjust the direction of air being discharged and/or the amount (intensity) of air being discharged, based on the information on indoor space.

The present disclosure is also directed to an air conditioner and/or a control method thereof that can find indoor space information including at least one or more pieces of information such as information on a distance between a vertical edge, which is an interwall boundary, and the air conditioner in indoor space, information on the position of the air conditioner in indoor space, and information on the direction where the air conditioner faces.

The present disclosure is also directed to an air conditioner and/or a control method thereof that can create an optimum air current depending on the structure of indoor space.

The present disclosure is also directed to an air conditioner and/or a control method thereof than can provide an optimum air current depending on the size of indoor space.

The present disclosure is also directed to a control method of an air conditioner that can operate in a different basic wind direction and/or a different basic air volume depending on the structure of indoor space where the air conditioner is installed.

The present disclosure is also directed to a control method of an air conditioner that can estimate the surface area of the floor of indoor space where the air conditioner is installed, and operate considering the estimated surface area of the floor.

The present disclosure is also directed to a control method of an air conditioner that can operate in a different wind direction and/or a different air volume depending on the structure of indoor space where the air conditioner is installed.

The present disclosure is also directed to an air conditioner and/or a control method thereof that can be prevented from being cooled and/or heated excessively.

The present disclosure is also directed to an air conditioner and/or a control method thereof that can reduce power consumption.

Aspects according to the present disclosure are not limited to the above ones, and other aspects and advantages that are not mentioned above can be clearly understood from the following description and can be more clearly understood from the embodiments set forth herein. Additionally, the aspects and advantages in the present disclosure can be realized via means and combinations thereof that are described in the appended claims.

Technical Solutions

In an air conditioner and/or a control method thereof of one embodiment, a wind direction may be adjusted based on the structure of indoor space where the air conditioner is installed. Thus, a temperature of the indoor space may reach a target temperature, and a temperature distribution rate in the indoor space may increase, within a shorter period of time.

In the air conditioner and/or the control method thereof of one embodiment, an air volume may be adjusted based on the structure of indoor space where the air conditioner is installed. Thus, a temperature of the indoor space may reach a target temperature, and a temperature distribution rate in the indoor space may increase, within a shorter period of time.

In the air conditioner and/or the control method thereof of one embodiment, air in a proper air current may be discharged to indoor space where the air conditioner is installed based on a temperature of the indoor space.

In the air conditioner and/or the control method thereof of one embodiment, an indoor space image may be obtained by a camera installed in the air conditioner, a master image may be obtained from the indoor space image, and based on the master image, information on a distance between the air conditioner and a vertical edge and/or on the position of the air conditioner in the indoor space may be found out, and based on the information, air being discharged may be controlled.

In the air conditioner and/or the control method thereof of one embodiment, the air conditioner may provide a high-speed air current and a comfortable air current. In this case, the air conditioner may selectively provide the high-speed air current and the comfortable air current based on a difference in an indoor temperature and a target temperature. And/or, the high-speed air current may be an air current in which air is discharged toward a corner farthest from the air conditioner among corners in indoor space. And/or, the comfortable air current may be an air current in which air is discharged toward left and right corners except for the farthest corner. For example, under the assumption that the high-speed air current is an air current in which air is discharged to the left or the right in a direction having a first angle with respect to the direction in which the air conditioner faces, the comfortable air current may be an air current in which air is discharged in a direction having a second angle greater than the first angle with respect to the direction in which the air conditioner faces.

In the air conditioner and/or the control method thereof of one embodiment, the amount of air being discharged may be adjusted based on the size of indoor space where the air conditioner is installed.

An air conditioner of one embodiment includes a wind direction controller changing a direction of air being discharged, an air volume controller changing an amount of air being discharged, a camera obtaining an image of indoor space and providing an indoor space image, and a control unit controlling the wind direction controller and the air volume controller, wherein the control unit finds indoor space information, based on the indoor space image, and controls at least one of the wind direction controller and the air volume controller, based on the indoor space information.

In the air conditioner of one embodiment, the indoor space information may include a position of a vertical edge that is an interwall boundary in the indoor space, and the control unit may control the wind direction controller, based on the position of the vertical edge. In the air conditioner of one embodiment, the indoor space information may include a distance between a vertical edge, which is an interwall boundary in the indoor space, and the air conditioner, and the control unit may control the air volume controller, based on the distance between the vertical edge and the air conditioner.

In the air conditioner of one embodiment, the control unit may obtain a master image including the vertical edge, an upper transverse edge that is a boundary between a wall and a ceiling in the indoor space, and a lower transverse edge that is a boundary between a wall and a floor in the indoor space, based on the indoor space image, and may find the indoor space information, based on the master image.

In the air conditioner of one embodiment, the control unit may obtain the master image by using a training model in which an image for training and data on the background, the ceiling, the walls and the floor of the image for training are used as input data.

In the air conditioner of one embodiment, the control unit may find a position of the vertical edge based on coordinate values of pixels corresponding to the vertical edge in the mater image.

In the air conditioner of one embodiment, the control unit may find a distance between the vertical edge and the air conditioner, based on a height of the indoor space, the number of pixels of a height of the vertical edge, and the position of the vertical edge.

In the air conditioner of one embodiment, the control unit may find a shape of the indoor space, based on the number of vertical edges and a length of the upper transverse edge.

In the air conditioner of one embodiment, the control unit may find a position of installation of the air conditioner, based on the number of vertical edges and lengths of the vertical edges.

In the air conditioner of one embodiment, the control unit may find a direction of the air conditioner, based on a position of a shortest vertical edge among the vertical edges.

In the air conditioner of one embodiment, the indoor space information may include positions of vertical edges that are interwall boundaries in the indoor space, and the control unit may control the wind direction controller to discharge air toward a shortest vertical edge among the vertical edges, as the air conditioner starts to operate.

In the air conditioner of one embodiment, the indoor space information may further include information on a surface area of the indoor space, and the control unit may control the air volume controller based on the surface area of the indoor space.

In the air conditioner of one embodiment, the indoor space information may include a first boundary on a right side of the shortest vertical edge, and a second boundary on a left side of the shortest vertical edge, and the control unit may control the wind direction controller to change a wind direction, with the first boundary and the second boundary at both ends, when receiving an instruction to rotate a wind direction from a user.

A control method of an air conditioner, which includes a camera obtaining an image of indoor space and providing an indoor space image, and a control unit receiving the indoor space image, of one embodiment includes finding indoor space information by the control unit, based on the indoor space image, and controlling at least one or more of a direction and an amount of air being discharged, by the control unit, based on the indoor space information.

In the control method of one embodiment, the indoor space information may include a position of a vertical edge that is an interwall boundary in the indoor space, and the step of controlling may include controlling a direction of air being discharged, based on the position of the vertical edge.

In the control method of one embodiment, the indoor space information may include a distance between a vertical edge, which is an interwall boundary in the indoor space, and the air conditioner, and the step of controlling may include controlling an amount of air being discharged, based on the distance.

In the control method of one embodiment, the step of finding indoor space information may include obtaining a master image including the vertical edge, an upper transverse edge that is a boundary between a wall and a ceiling in the indoor space, and a lower transverse edge that is a boundary between a wall and a floor in the indoor space, based on the indoor space image, and finding the indoor space information, based on the master image.

In the control method of one embodiment, the step of obtaining a master image may include using a training model in which an image for training and data on the background, the ceiling, the walls and the floor of the image for training are used as input data and obtaining the master image.

In the control method of one embodiment, the step of finding indoor space information may include finding a position of the vertical edge, based on coordinate values of pixels corresponding to the vertical edge in the mater image.

In the control method of one embodiment, the step of finding indoor space information may include finding a distance between the vertical edge and the air conditioner, based on a height of the indoor space, the number of pixels of a height of the vertical edge, and the position of the vertical edge.

In the control method of one embodiment, the step of finding indoor space information may include finding a shape of the indoor space, based on the number of vertical edges and a length of the upper transverse edge.

In the control method of one embodiment, the step of finding indoor space information may include finding a position of installation of the air conditioner, based on the number of vertical edges and lengths of the vertical edges.

In the control method of one embodiment, the step of finding indoor space information may include finding a direction of the air conditioner, based on a position of a shortest vertical edge, among the vertical edges.

An air conditioner of one embodiment includes a camera obtaining an image of indoor space and providing an indoor space image, and a control unit finding indoor space information, based on the indoor space image, and setting an air current of air being discharged, based on the indoor space information, wherein the indoor space information includes positions of vertical edges that are interwall boundaries in the indoor space, and the control unit sets an air current including an air current in which air is discharged toward a farthest vertical edge among the vertical edges to a high-speed air current, sets an air current in which air is discharged in a first direction further leftward than a direction in which air in the high-speed air current is discharged and in a second direction further rightward than the direction in which air in the high-speed air current is discharged to a comfortable air current, and discharges air in any one of the high-speed air current and the comfortable air current.

In the air conditioner of one embodiment, the control unit may control the air conditioner to discharge air in the comfortable air current, while controlling the air conditioner to discharge air in the high-speed air current, when a difference between an indoor temperature that is a measured temperature of the indoor space and a target temperature that is set by a user is a first set temperature or less.

In the air conditioner of one embodiment, the control unit may control the air conditioner to discharge air in the high-speed air current, while controlling the air conditioner to discharge air in the comfortable air current, when a difference between an indoor temperature that is a measured temperature of the indoor space and a target temperature that is set by a user is a second set temperature or greater.

In the air conditioner of one embodiment, the control unit may control the air conditioner to discharge air in the high-speed air current, while controlling the air conditioner to discharge air in the comfortable air current, when a duration, for which a difference between an indoor temperature that is a measured temperature of the indoor space, and a target temperature that is set by a user is the second set temperature or greater, exceeds a predetermined duration.

In the air conditioner of one embodiment, the indoor space information may further include information on a position of the air conditioner in the indoor space, and the control unit may find the position of the air conditioner, based on the number of vertical edges, and set the high-speed air current and the comfortable air current, based on the position of the air conditioner.

In the air conditioner of one embodiment, the indoor space information may further include information on the position of the air conditioner in the indoor space, and the control unit may set an air current in which air is discharged toward a farthest vertical edge among the vertical edges to the high-speed air current, set a direction of a leftmost vertical edge among the vertical edges to the first direction, and set a direction of a rightmost vertical edge among the vertical edges to the second direction, when determining that the air conditioner is placed at a corner of the indoor space.

In the air conditioner of one embodiment, the indoor space information may further include information on the position of the air conditioner in the indoor space, and the control unit may set an air current, in which air is discharged toward a first vertical edge that is a farthest vertical edge among the vertical edges and toward a second vertical edge being adjacent to the first vertical edge, to the high-speed air current, and determine a direction, in which air is discharged to a leftmost side from the air conditioner, to the first direction, and determine a direction, in which air is discharged to a rightmost side from the air conditioner, to the second direction, when determining that the air conditioner is on a wall of the indoor space.

In the air conditioner of one embodiment, the indoor space information may include information on a size of the indoor space, and the control unit may determine intensity of the comfortable air current, based on the information on the size of the indoor space.

A control method of an air conditioner, which includes a camera obtaining an image of indoor space and providing an indoor space image, and a control unit controlling a direction of air being discharged, of one embodiment includes finding indoor space information including information on positions of vertical edges, which are interwall boundaries in indoor space, by the control unit, based on the indoor space image, setting an air current including an air current, in which air is discharged toward a farthest vertical edge among vertical edges, to a high-seed air current, setting an air current, in which air is discharged in a first direction further leftward than a direction in which air in the high-speed air current is discharged and in a second direction further rightward than the direction in which air in the high-speed air current is discharged, to a comfortable air current, by the control unit, and selecting one of the high-speed air current and the comfortable air current and controlling the air conditioner to discharge air in the selected air current, by the control unit.

In the control method of one embodiment, the step of controlling the air conditioner may include controlling the air conditioner by the control unit to discharge air in the high-speed air current, and changing an air current of air being discharged from the high-speed air current to the comfortable air current by the control unit, when a difference between an indoor temperature that is a measured temperature of the indoor space and a target temperature that is set by a user is a first set temperature or less.

In the control method of one embodiment, the step of controlling the air conditioner may include controlling the air conditioner by the control unit to discharge air in the comfortable air current, and changing an air current of air being discharged from the high-speed air current to the changing an air current of air being discharged from the comfortable air current to the high-speed air current by the control unit, when a difference between an indoor temperature that is a measured temperature of the indoor space and a target temperature that is set by a user is a second set temperature or greater.

In the control method of one embodiment, the step of controlling the air conditioner may include controlling the air conditioner by the control unit to discharge air in the comfortable air current, and changing an air current of air being discharged from the comfortable air current to the high-speed air current by the control unit, when a duration, for which a difference between an indoor temperature that is a measured temperature of the indoor space and a target temperature that is set by a user is the second set temperature or greater, exceeds a predetermined duration.

The control method of one embodiment may further include finding a position of the air conditioner by the control unit, based on the indoor space image, and the setting step may include setting the high-speed air current and the comfortable air current by the control unit, based on the position of the air conditioner.

In the control method of one embodiment, the step of finding a position of the air conditioner may include finding a position of the air conditioner by the control unit, based on the number of vertical edges.

In the control method of one embodiment, the setting step may include setting an air current, in which air is discharged toward a farthest vertical edge among the vertical edges, to the high-speed air current by the control unit, setting a direction of a leftmost vertical edge among the vertical edges to the first direction by the control unit, and setting a direction of a rightmost vertical edge among the vertical edges to the second direction by the control unit, when the control unit determines that the air conditioner is placed at a corner of the indoor space.

In the control method of one embodiment, the setting step may include setting an air current, in which air is discharged toward a first vertical edge that is a farthest vertical edge among the vertical edges and toward a second vertical edge being adjacent to the first vertical edge, to the high-speed air current by the control unit, determining a direction, in which air is discharged to a leftmost side from the air conditioner, to the first direction by the control unit, and determining a direction, in which air is discharged to a rightmost side from the air conditioner, to the second direction by the control unit, when the control unit determines that the air conditioner is on a wall of the indoor space.

The control method of one embodiment may further include finding information on a size of the indoor space by the control unit, based on the indoor space image, and determining intensity of the comfortable air current by the control unit, based on the information on the size of the indoor space.

The control method of one embodiment includes photographing indoor space in which the air conditioner is installed and obtaining an indoor space image, obtaining an indoor structure image, based on the indoor space image, estimating a surface area of a floor of the indoor space, based on the indoor structure image, setting a basin wind direction, based on the indoor structure image, setting a basic air volume, based on the surface area of the floor of the indoor space, and operating the air conditioner, based on the basic wind direction and the basic air volume.

In the control method of one embodiment, the step of estimating a surface area of a floor of the indoor space may include dividing the indoor structure image into cells of a predetermined size, and estimating the surface area of the floor of the indoor space by using the divided indoor structure image and a height of the indoor space.

The control method of one embodiment may further include receiving the height of the indoor space from a user before estimating the surface area of the floor of the indoor space.

In the control method of one embodiment, the step of setting a basic wind direction may include determining a shortest interwall boundary among interwall boundaries included in the indoor structure image, and setting a direction of the shortest interwall boundary to the basic wind direction.

In the control method of one embodiment, the step of setting a basic air volume may include calculating a difference between the surface area of the floor of the indoor space and a reference surface area for use of the air conditioner, setting a first predetermined air volume to the basic air volume when the difference is a first set value or greater, setting a second predetermined air volume to the basic air volume when the difference is less than the first set value and a second set value or greater, and setting a third predetermined air volume to the basic air volume when the difference is less than the second set value.

The control method of one embodiment may further include determining a first boundary and a second boundary among the interwall boundaries, included in the indoor structure image, when an instruction to rotate a wind direction is received from a user, and operating the air conditioner to change a wind direction with the first boundary and the second boundary at both ends.

In the control method of one embodiment, the step of operating the air conditioner to change a wind direction with the first boundary and the second boundary at both ends may include calculating a distance between interwall boundaries included in the indoor structure image, and the air conditioner, and operating the air conditioner 100 to change an air volume, based on the calculated distance, while changing a wind direction with the first boundary and the second boundary at both ends.

The control method of one embodiment may further include determining initial load elements included in the indoor space image after the setting of the basic air volume, calculating a total number of the initial load elements, and adjusting the basic air volume, based on the total number of the initial load elements.

The control method of one embodiment may further include photographing the indoor space during the operation of the air conditioner and obtaining an indoor space image again, and calculating a total number of load elements included in the indoor space image photographed during the operation of the air conditioner, and comparing the total number of the load elements with the total number of the initial load elements and adjusting the basic air volume.

An air conditioner of one embodiment includes a camera photographing indoor space where the air conditioner is installed and obtaining an indoor space image, and a control circuit operating the air conditioner based on the indoor space image, wherein the control circuit obtains an indoor structure image based on the indoor space image, estimates a surface area of a floor of the indoor space based on the indoor structure image, sets a basic wind direction based on the indoor structure image, sets a basic air volume based on the surface area of the floor of the indoor space, and operates the air conditioner depending on the basic wind direction and the basic air volume.

In the air conditioner of one embodiment, the control circuit may divide the indoor structure image into cells of a predetermined size, and estimate the surface area of the floor of the indoor space by using the divided indoor structure image and a height of the indoor space.

In the air conditioner of one embodiment, the control circuit may receive the height of the indoor space from a user before estimating the surface area of the floor of the indoor space.

In the air conditioner of one embodiment, the control circuit may determine a shortest interwall boundary among interwall boundaries included in the indoor structure image, and set a direction of the shortest interwall boundary to the basic wind direction.

In the air conditioner of one embodiment, the control circuit may calculate a difference between the surface area of the floor of the indoor space and a reference surface area for use of the air conditioner, set a first predetermined air volume to the basic air volume when the difference is a first set value or greater, set a second predetermined air volume to the basic air volume when the difference is less than the first set value and a second set value or greater, and set a third predetermined air volume to the basic air volume when the difference is less than the second set value.

In the air conditioner of one embodiment, the control circuit may determine a first boundary and a second boundary among the interwall boundaries included in the indoor structure image, when receiving an instruction to rotate a wind direction from a user, and operate the air conditioner to change a wind direction with the first boundary and the second boundary at both ends.

In the air conditioner of one embodiment, the control circuit may calculate a distance between the interwall boundaries included in the indoor structure image, and the air conditioner, and operate the air conditioner to change an air volume, based on the calculated distance, while changing a wind direction with the first boundary and the second boundary at both ends.

In the air conditioner of one embodiment, the control circuit may determine initial load elements included in the indoor space image after the setting of the basic air volume, calculate a total number of the initial load elements, and adjust the basic air volume, based on the total number of the initial load elements.

In the air conditioner of one embodiment, the control circuit may photograph the indoor space during the operation of the air conditioner and obtain an indoor space image again, and calculate a total number of load elements included in the indoor space image photographed during the operation of the air conditioner, and compare the total number of the load elements with the total number of the initial load elements and adjust the basic air volume.

A control method of an air conditioner of one embodiment may include finding information on positions of vertical edges that are interwall boundaries in the indoor space, based on the indoor space image, and controls a direction of air being discharged toward a shortest vertical edge among the vertical edges, as the air conditioner starts to operate.

The control method of one embodiment may include finding information on a surface area of the indoor space, based on the indoor space image, and controlling an amount of air being discharged, based on the surface area of the indoor space.

The control method of one embodiment may include further finding a first boundary on a right side of the shortest vertical edge, and a second boundary on a left side of the shortest vertical edge, and when an instruction to rotate a wind direction is received from a user, changing a direction of air being discharged, with the first boundary and the second boundary at both ends.

Advantageous Effects

An air conditioner and/or a control method thereof in one embodiment may make it possible to adjust an indoor temperature to a target temperature within a shorter period of time.

The air conditioner and/or the control method thereof in one embodiment may make it possible to increase a temperature distribution rate in indoor space within a shorter period of time.

The air conditioner and/or the control method thereof in one embodiment may make it possible to create a pleasant environment in indoor space within a shorter period of time.

The air conditioner and/or the control method thereof in one embodiment may make it possible to find information on the structure of indoor space more accurately.

The air conditioner and/or the control method thereof in one embodiment may make it possible to detect a distance between a vertical edge, i.e., an interwall boundary in indoor space, and the air conditioner, and control a wind direction and an air volume based on the distance, adjusting the temperature of the indoor space more efficiently.

The air conditioner and/or the control method thereof in one embodiment may make it possible to find information on the position of the air conditioner in indoor space, and adjust air being discharged from the air conditioner based on the information, adjusting the temperature of the indoor space more efficiently.

The air conditioner and/or the control method thereof in one embodiment may make it possible to create an optimum air current based on the structure of indoor space.

The air conditioner and/or the control method thereof in one embodiment may make it possible to provide an optimum air current based on the size of indoor space.

The air conditioner and/or the control method thereof in one embodiment may make it possible to prevent the overcooling and/or overheating of the air conditioner.

The air conditioner and/or the control method thereof in one embodiment may make it possible to reduce power consumption.

The control method of an air conditioner according to the present disclosure may make it possible to operate an air conditioner in a different basic wind direction and a different basic air volume based on the structure of indoor space where the air conditioner is installed, circulating air in the indoor space more smoothly.

The control method of an air conditioner according to the present disclosure may make it possible to operate an air conditioner considering the surface area of the floor of indoor space where the air conditioner is installed, cooling and heating the indoor space more efficiently.

The control method of an air conditioner according to the present disclosure may make it possible to operate an air conditioner in a different wind direction and a different air volume based on the structure of indoor space where the air conditioner is installed, ensuring the uniform temperature of the entire indoor space.

Specific effects are described along with the above-described effects in the section of Detailed Description.

DETAILED DESCRIPTION OF EXEMPLARY EMBODIMENTS

Figure 1:
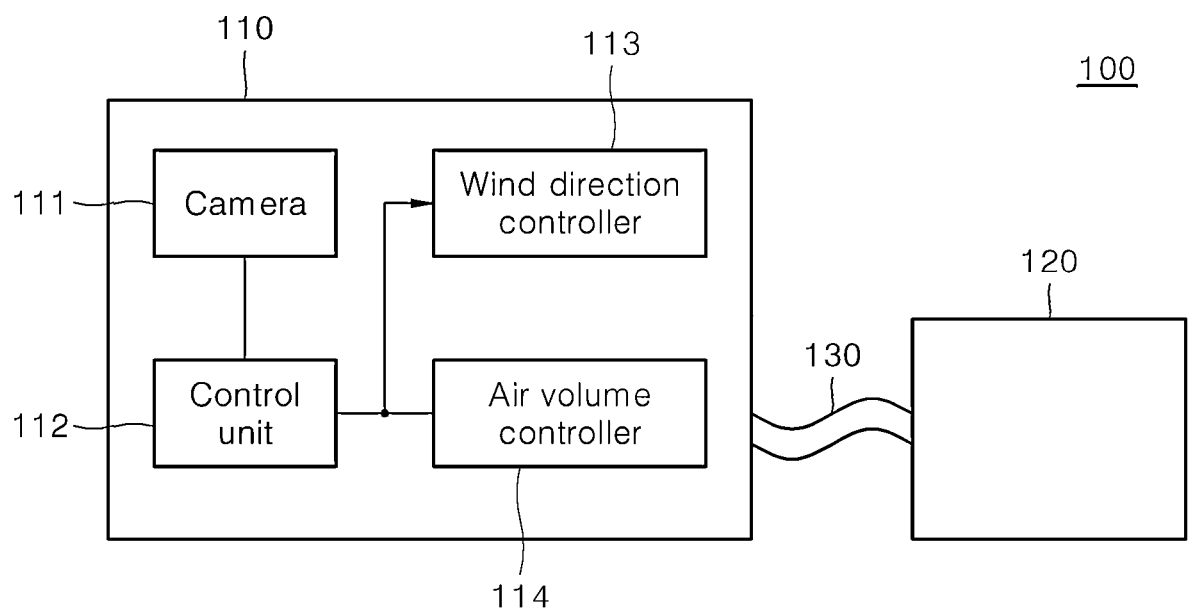
FIG. 1 is a block diagram schematically showing the configuration of an air conditioner in one embodiment.

The above-described aspects, features and advantages are specifically described hereafter with reference to the accompanying drawings such that one having ordinary skill in the art to which the present disclosure pertains can embody the technical spirit of the disclosure easily. In the disclosure, detailed description of known technologies in relation to the disclosure is omitted if it is deemed to make the gist of the disclosure unnecessarily vague. Hereafter, preferred embodiments according to the disclosure are specifically described with reference to the accompanying drawings. In the drawings, identical reference numerals can denote identical or similar components.

The terms "first", "second" and the like are used herein only to distinguish one component from another component. Thus, the components should not be limited by the terms. Certainly, a first component can be a second component unless stated to the contrary.

When one component is described as being "in the upper portion (or the lower portion)" or "on (or under)" another component, one component can be directly on or under another component, and an additional component can be interposed between the two components.

When any one component is described as being "connected", "coupled", or "connected" to another component, any one component can be directly connected or coupled to another component, but an additional component can be "interposed" between the two components or the two components can be "connected", "coupled", or "connected" by an additional component.

Throughout the disclosure, each component can be provide as a single one or a plurality of ones, unless stated to the contrary.

In the disclosure, singular forms include plural forms as well, unless explicitly indicated otherwise. It is to be understood that the terms such as "comprise" or "include" and the like, when used in this disclosure, are not interpreted as necessarily including stated components or steps, but can be interpreted as excluding some of the stated components or steps or as further including additional components or steps.

Throughout the disclosure, the terms "A and/or B" as used herein can denote A, B or A and B, and the terms "C to D" can denote C or greater and D or less, unless stated to the contrary.

Hereafter, an air conditioner and a control method of the same in several embodiments are described.

FIG. 1 is a block diagram schematically showing the configuration of an air conditioner of one embodiment. The air conditioner 100 of one embodiment may include an indoor unit 110 and an outdoor unit 120. A pipe 130 may connect between the indoor unit 110 and the outdoor unit 120. Additionally, the indoor unit 110 may include a camera 111, a control unit 112, a wind direction controller 113, and an air volume controller 114.

The indoor unit 110 may discharge cold air or hot air to an indoor space where the indoor unit 110 is installed to control temperature of the indoor space. To this end, the indoor unit 110 may include a heat exchanger that allows of heat exchange between indoor air and refrigerants. For example, as the indoor unit 110 operates in a cooling mode, the indoor unit 100 may discharge cold air to the space where the indoor unit 110 is installed, and as the indoor unit 110 operates in a heating mode, the indoor unit 110 may discharge warm air to the space where the indoor unit 110 is installed. The indoor unit 110 may be a floor-standing one or a wall-mounted one. Additionally, the indoor unit 110 may include a discharge outlet through which air is discharged. In this case, a single discharge outlet or a plurality of discharge outlets may be provided.

The camera 111 of the indoor unit 110 may photograph the indoor space where the indoor unit 110 of the air conditioner 100 is installed to obtain an indoor space image. That is, the camera 111 may photograph the indoor space and obtain a two-dimensional indoor space image. The camera 111 may be disposed near the center of the indoor unit 110 of the air conditioner 100 with respect to the left-right direction. For example, in the case of a floor-standing indoor unit 110, the camera 111 may be disposed in the upper portion of the floor-standing indoor unit while being disposed near the center of the floor-standing indoor unit in the left-right direction.

The control unit 112 of the indoor unit 110 may find indoor space information, based on the indoor space image obtained through the camera 111, and operate the air conditioner 100, based on the indoor space information and/or the temperature (a measured temperature) of the indoor space. The control unit 112 may include at least one or more of processing units. In a control unit 112 including a plurality of processing units, each of the plurality of processing units may be installed in different devices that are physically spaced from one another.

To control the operations of the air conditioner 100, the control unit 112 may find the indoor space information, based on the indoor space image. The indoor space information may include at least one or more pieces of information including information on the structure of indoor space, information on the position of disposition of an air conditioner (an indoor unit in the case of a split air conditioner) in the indoor space, and a direction faced by the air conditioner (an indoor unit in the case of a split air conditioner). The information on the structure of the indoor space may include at least one or more pieces of information including information on the position (direction) of a vertical edge that is a boundary between a wall and a wall and information on the sizes of the vertical edge and the indoor space. The information on the size of the indoor space may include at least one or more pieces of information including a distance between a vertical edge and an air conditioner and the surface area of the indoor space.

Figure 7:
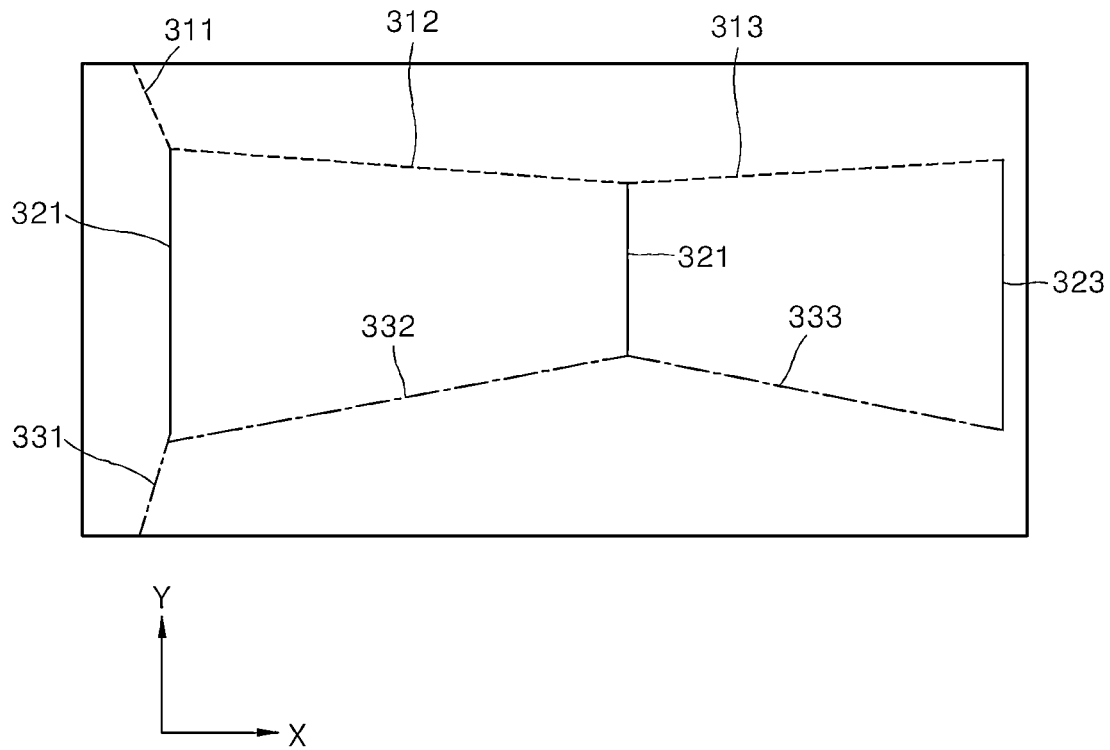
FIG. 7 is a view showing an example of a master image estimated based on an image obtained by the air conditioner of one embodiment in the state in which the air conditioner of one embodiment is installed as illustrated in FIG. 6.

To find the information on the structure of the indoor space, the control unit 112 may obtain a master image based on the indoor space image. The master image may be an image in which an upper transverse edge that is a boundary between the ceiling and a wall, a vertical edge that is an interwall boundary, and a lower transverse edge that is a boundary between a wall and the floor are extracted and displayed, based on the indoor space image. FIG. 7 shows an example of the master image.

The control unit 112 may extract a characteristic area from the indoor space image. The control unit 112 may estimate boundaries that are not directly seen in the indoor space image. The control unit 112 may obtain the master image, using results of its extraction and estimation. In this case, the control unit 112 may use a fully-connected convolutional neural network (FCN) to obtain the master image more accurately.

Depending on embodiments, the control unit 112 may use a model that performs learning by using deep learning methods. The method of obtaining a master image with a learning model is specifically described below with reference to FIG. 5.

Additionally, the control unit 112 may find the above indoor space information, based on the master image.

For example, the control unit 112 may find the position of a vertical edge, a distance to a vertical edge, the shape of the indoor space, the installation position of the indoor unit and the like, based on the master image. The method of finding the indoor space information is described below with reference to FIG. 8.

Figure 9:
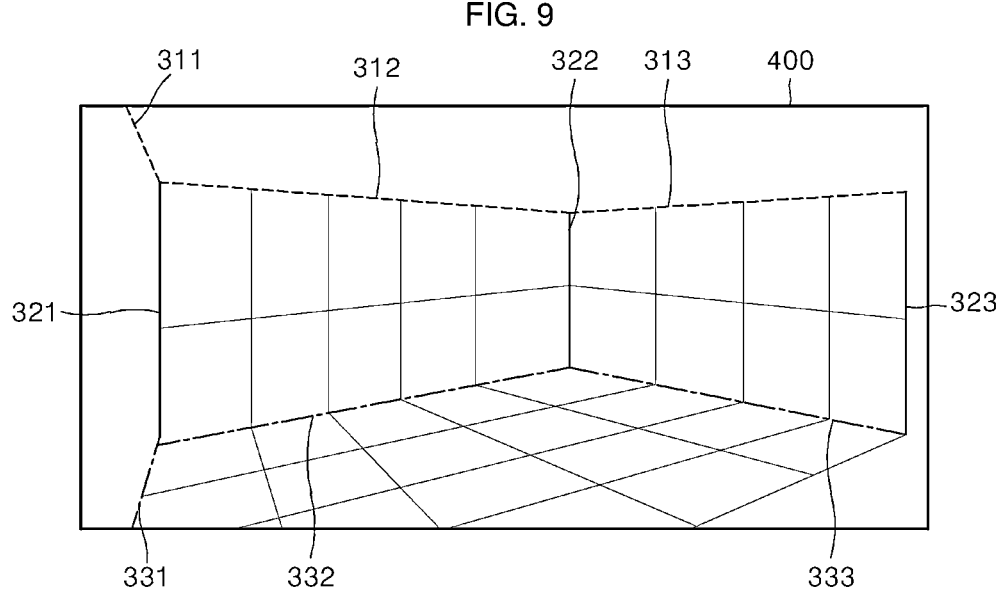
FIG. 9 is a view showing an example of the master image in FIG. 7 divided into cells of a predetermined size.

Depending on embodiments, the control unit 112 may estimate the surface area of the indoor space (e.g., the surface area of the floor of the indoor space), based on the master image. Specifically, the control unit 112 may divide an indoor structure image into cells of a predetermined size, and estimate the surface area of the floor of the indoor space by using the divided indoor structure image and the height of the indoor space. Specifically, FIG. 9 shows an example of the divided indoor structure image, and the divided indoor structure image and the method in which the control unit 112 divides the indoor structure image are specifically described below with reference to FIG. 9.

Depending on embodiments, the control unit 112 may receive the height of the indoor space to find the indoor space information. The height of the indoor space denotes a minimum distance from the ceiling of the indoor space where the air conditioner 100 (an indoor unit 110 of a split air conditioner) is installed to the floor of the indoor space. The height of the indoor space may be input by a user.

Further, the control unit 112 may set current of air being discharged from the air conditioner 100 (an indoor unit 110 of a split air conditioner), based on the indoor space information and the temperature of the indoor space found by the control unit 112. Though not illustrated, the control unit 112 may obtain information on indoor temperature from the temperature sensor included in the indoor unit 110, or obtain information on indoor temperature through an input device included in the control unit 112 or based on a communication connection.

The air current of air being discharged may include at least one or more of a direction of the discharge of air and an amount of air being discharged (or wind speed). The method in which the control unit 112 sets air currents is specifically described below with reference to FIGS. 3 to 18.

The wind direction controller 113 of the indoor unit 110 may change the direction of air being discharged from the discharge outlet of the indoor unit 110, under the control of the control unit 112. The wind direction controller 113 may include a structure including a discharge outlet, and a driving unit that drives the structure. Alternatively, the wind direction controller 113 may include a vane being disposed at the discharge outlet and a driving unit that adjusts the angle of the vane.

In the case of an indoor unit 110 having a plurality of discharge outlets, a structure including the plurality of discharge outlets or a vane being disposed at each of the plurality of discharge outlets may be controlled independently. For example, when the indoor unit 110 is viewed in front of the indoor unit 110, the plurality of discharge outlets may include a first discharge outlet being disposed at the left side of the indoor unit 110, and a second discharge outlet being disposed at the right side of the indoor unit 110. A structure including the first discharge outlet may be controlled to discharge air to the left side, and a structure including the second discharge outlet may be controlled to discharge air to the right side. Depending on embodiments, the plurality of discharge outlets may be disposed vertically.

In the case of an indoor unit 110 having a single discharge outlet, the vanes disposed at the discharge outlet may be divided into a plurality of groups. Each of the plurality of groups may be controlled independently. For example, when the indoor unit 110 is viewed in front of the indoor unit 110, a first group of vanes may be disposed at the left side of the discharge outlet, and a second group of vanes may be disposed at the right side of the discharge outlet. The first group of vanes may be controlled to discharge air to the left side, and the second group of vanes may be controlled to discharge air to the right side. Accordingly, air being discharged from a single discharge outlet may be discharged in two directions. Depending on embodiments, the first group of vanes and the second group of vanes may be disposed vertically.

The air volume controller 114 may change the amount of air being discharged from the discharge outlet of the indoor unit 110 under the control of the control unit 112. The air volume controller 114 may include at least one or more of fans.

The outdoor unit 120 may include a compressor, a heat exchanger, a fan and the like. The outdoor unit 120 may supply refrigerants to the indoor unit 110 through the pipe 130 connecting to the indoor unit 110. In this case, the outdoor unit 120 may operate in a cooling mode or a heating mode, depending on an operation mode of the indoor unit 110 connecting with the outdoor unit 120.

FIG. 1 shows the air conditioner is a split air conditioner in which an indoor unit separates from an outdoor unit in one embodiment, for example. However, the concept in the disclosure may be applied to an integrated air conditioner in which an indoor unit and an outdoor unit are integrated. That is, in the present disclosure, a split air conditioner is given as an example of the air conditioner but not intended to limit the scope of the right to the subject matter of the disclosure, and the control method of an air conditioner, which is described below, may be applied to an integrated air conditioner.

Figure 2:
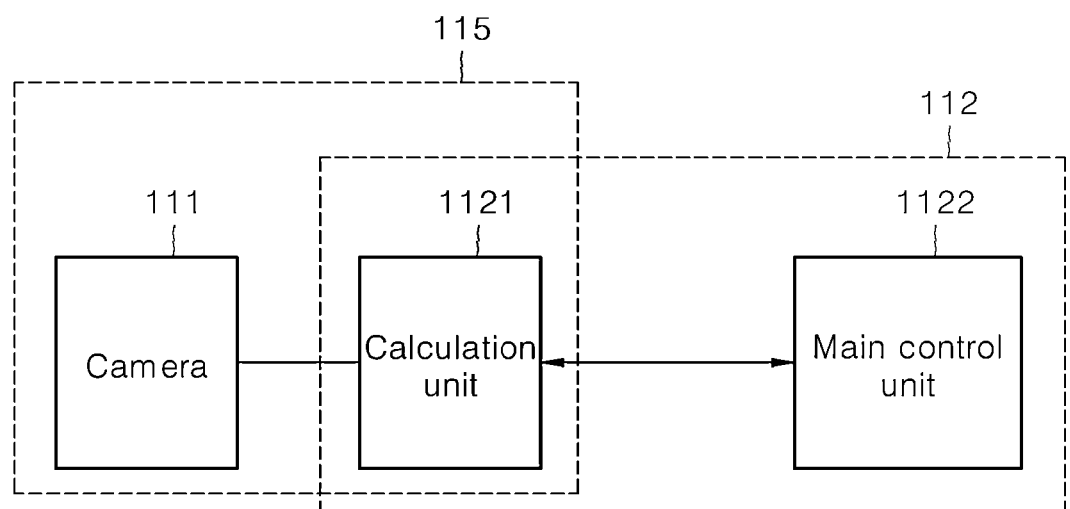
FIG. 2 is a block diagram schematically showing an example of a control unit of the air conditioner of one embodiment in FIG. 1.

FIG. 2 is a block diagram schematically showing an example of a control unit 112 of the air conditioner of one embodiment in FIG. 1. The control unit 112 may include a calculation unit 1121, and a main control unit 1122. The camera 111 and the calculation unit 1121 may be included in a camera module 115.

The calculation unit 1121 may extract indoor space information, based on the indoor space image obtained by the camera 111, and provide the extracted indoor space information to the main control unit 1122.

The main control unit 1122 may control the wind direction controller (113 in FIG. 1) and/or the air volume controller (114 in FIG. 1), based on the indoor space information and/or indoor temperature and the like.

The calculation unit 1121 and the main control unit 1122 may transmit and receive data mutually, using asynchronous serial data communication.

The calculation unit 1121 and the main control unit 1122 may respectively include at least one of a processing unit and memory. For example, the processing unit may include a central processing unit (CPU), a graphics processing unit (GPU), a microprocessor, an application-specific integrated circuit (ASIC), a field-programmable gate array (FPGA), a digital signal processor (DSP), a digital signal processing device (DSPD), a programmable logic device (PLD), a controller, a micro-controller and the like, and have a plurality of cores. The memory may be volatile memory (e.g., RAM and the like), non-volatile memory (e.g., ROM, flash memory and the like) or a combination thereof.

Additionally, each of the calculation unit 1121 and the main control unit 1122 may include an additional storage. The storage may include magnetic storage, optical storage, flash memory and the like but not be limited. Computer-readable instructions for embodying one or more embodiments presented in the disclosure and other computer-readable instructions for embodying an operation system, an application program and the like may be stored in the storage or the memory. The computer-readable instructions stored in the storage may be loaded to the memory to be executed by a processing unit.

Though not illustrated, the calculation unit 1121 and/or the main control unit 1122 may include an input device(s) and an output device(s). The input device(s) may include a voice input device, a touch input device, a video input device or any other input device and the like, for example. The output device(s) may include one or more displays, speakers or any other output devices and the like, for example.

Further, the calculation unit 1121 and/or the main control unit 1122 may use an input device or an output device provided for another computing device (e.g., a smartphone or a tablet) as the input device(s) or the output device(s).

Furthermore, the calculation unit 1121 and/or the main control unit 1122 may include a communication connector(s) that allows of communication with another computing device. The communication connector(s) may include another interface for connecting a modem, a network interface card (NIC), an integrated network interface, a radio frequency transmitter/receiver, an infrared port, a USB connector or a control unit 112 to another computing device. Additionally, the communication connector(s) may include a wired connector or a wireless connector.

In one embodiment, since the control unit 112 includes the calculation unit 1121 and the main control unit 1122, the control unit 112 may obtain indoor space information while ease the burden of the main control unit 1122 that controls the air conditioner. However, the control unit 12 of the present invention is not limited to the above description. For example, the control unit 112 may include a single processing unit. In this case, the single processing unit may find indoor space information and control the air conditioner based on the indoor space information.

Figure 3:
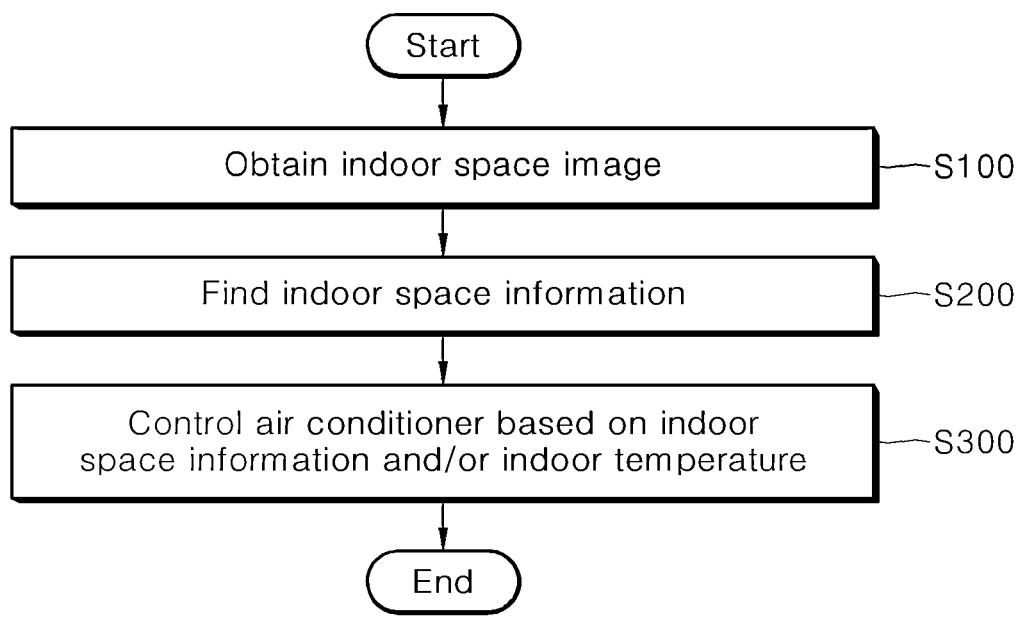
FIG. 3 is a process flowchart for describing a control method of an air conditioner in one embodiment.

FIG. 3 is an operation flowchart for describing a control method of an air conditioner in one embodiment. Each of the steps in FIG. 3 may be performed by the control unit 112 (by the calculation unit (1121 in FIG. 2) or the main control unit (1122) in the case of a control unit 112 configured as illustrated in FIG. 2) in FIG. 1.

The control unit 112 (the calculation unit (1121 in FIG. 2) in the case of a control unit configured as illustrated in FIG. 2) may obtain an indoor space image (S100). For example, the control unit 112 (the calculation unit (1121 in FIG. 2) in the case of a control unit configured as illustrated in FIG. 2) may receive the indoor space image from the camera (111 in FIG. 1).

Then the control unit 112 (the calculation unit (1121 in FIG. 2) in the case of a control unit configured as illustrated in FIG. 2) may find indoor space information, using the indoor space image (S200). The indoor space information may include at least one or more pieces of information including information on the structure of indoor space, information on the position of disposition of an air conditioner (an indoor unit in the case of a split air conditioner) in the indoor space, and a direction faced by the air conditioner (an indoor unit in the case of a split air conditioner)

in the indoor space. The information on the structure of indoor space may include at least one or more pieces of information including information on the position (direction) of a vertical edge that is a boundary between a wall and a wall in the indoor space, information on the size of the indoor space, and information on the size of the shape of the indoor space. The information on the size of the indoor space may include at least one or more pieces of information including a distance between an air conditioner (an indoor unit in the case of a split air conditioner) and a vertical edge, and the surface area of the indoor space (specifically, the surface area of the floor of the indoor space).

Then the control unit 112 (the main control unit (1122 in FIG. 2) in the case of a control unit configured as illustrated in FIG. 2) may control the air conditioner, based on the indoor space information and/or indoor temperature (S300). For example, the control unit 112 (the main control unit (1122 in FIG. 2) in the case of a control unit configured as illustrated in FIG. 2) may control at least one or more of the wind direction controller (113 in FIG. 1) and the air volume controller (114 in FIG. 1), based on the indoor space information and/or indoor temperature.

For example, the direction of wind may be adjusted based on the position of a vertical edge (a boundary between a wall and a wall) included in the indoor space information. Specifically, the control unit 112 (the main control unit (1122 in FIG. 2) in the case of a control unit configured as illustrated in FIG. 2) may control the air conditioner to discharge air toward a vertical edge farthest from the air conditioner (an indoor unit in the case of a split air conditioner), thereby raising indoor temperature to a target temperature more quickly. Alternatively, in the mode where the direction of wind changes on a regular basis, the control unit 112 (the main control unit (1122 in FIG. 2) in the case of a control unit configured as illustrated in FIG. 2) may set a range in which air is discharged with respect to the positions of vertical edges to perform a cooling operation or a heating operation more efficiently. Alternatively, the control unit 112 (the main control unit (1122 in FIG. 2) in the case of a control unit configured as illustrated in FIG. 2) ma increase the amount of air when the air is discharged toward a vertical edge relatively far from the air conditioner, and decrease the amount of air when the air is discharged toward a vertical edge relatively close to the air conditioner, thereby performing a cooling operation or a heating operation more efficiently.

Figure 4:
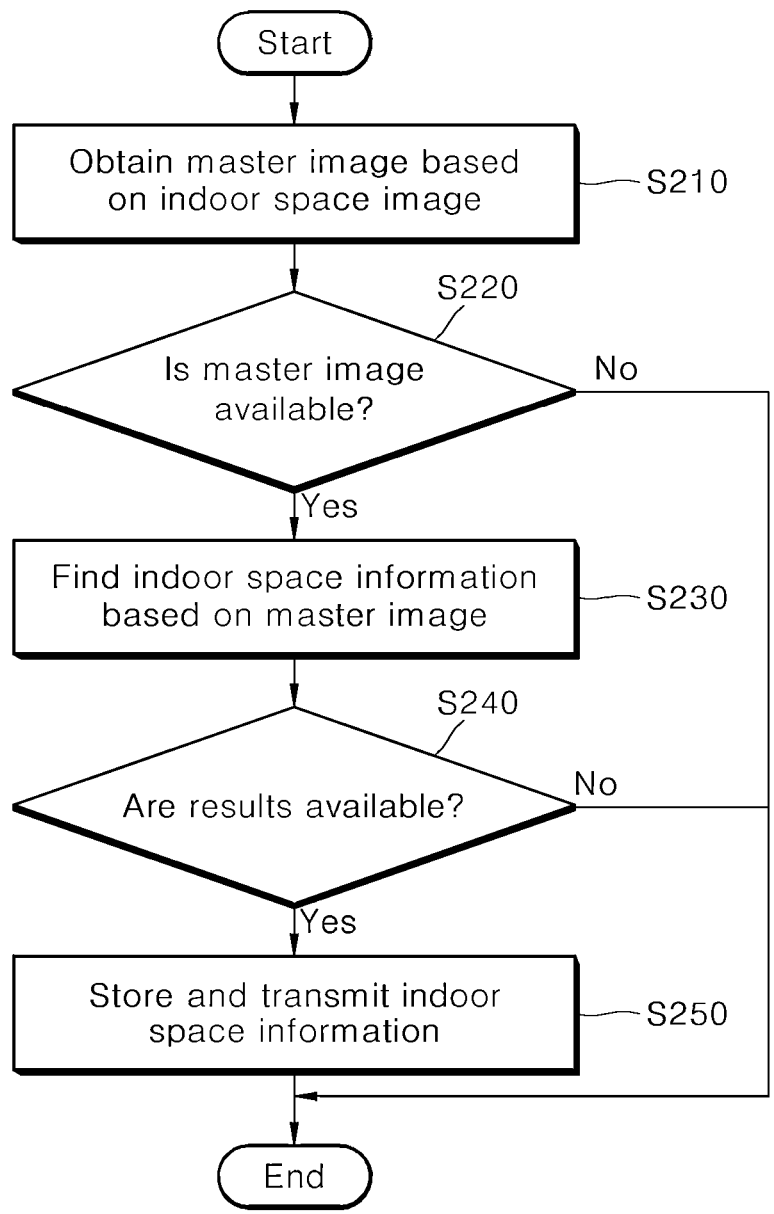
FIG. 4 is a process flowchart for describing an example of the step of finding indoor space information in the control method of an air conditioner in one embodiment.

FIG. 4 is a processing flowchart for describing an example of the step (step 200 in FIG. 3) of finding indoor space information in the control method of an air conditioner in one embodiment. Each of the steps in FIG. 4 may be performed by the control unit 112 in FIG. 1 (the calculation unit (1121 in FIG. 2) in the case of a control unit 112 configured as illustrated in FIG. 2).

The control unit 112 (the calculation unit (1121 in FIG. 2) in the case of a control unit configured as illustrated in FIG. 2) may obtain a master image, based on indoor space image (S210). The master image may be an image in which a vertical edge that is an interwall boundary in indoor space, an upper transverse edge that is a boundary between a wall and the ceiling, and a lower transverse edge that is a boundary between a wall and the floor are expressed as a segment.

As described above, the control unit 112 (the calculation unit (1121 in FIG. 2) in the case of a control unit configured as illustrated in FIG. 2) may extract characteristic areas from the indoor space image, to obtain a master image. Additionally, the control unit 112 (the calculation unit (1121 in FIG. 2) in the case of a control unit configured as illustrated in FIG. 2) may determine boundaries that are not directly seen in the indoor space image, to obtain a master image. To this end, the control unit 112 (the calculation unit (1121 in FIG. 2) in the case of a control unit configured as illustrated in FIG. 2) may use a fully-connected convolutional neural network (FCN).

Depending on embodiments, the control unit 112 (the calculation unit (1121 in FIG. 2) in the case of a control unit configured as illustrated in FIG. 2) may use deep earning-based learning machine.

Then the control unit 112 (the calculation unit (1121 in FIG. 2) in the case of a control unit configured as illustrated in FIG. 2) may determine whether the master image is available (S220). For example, the control unit 112 (the calculation unit (1121 in FIG. 2) in the case of a control unit configured as illustrated in FIG. 2) may determine whether the master image extracted in step 210 is available by using an ordinary algorithm for image verification.

When the master image is not available as a result of the determination in step 220, the control unit 112 (the calculation unit (1121 in FIG. 2) in the case of a control unit configured as illustrated in FIG. 2) may end the operation of finding indoor space information. In this case, the control unit 112 (the main control unit (1122 in FIG. 2) in the case of a control unit configured as illustrated in FIG. 2) may control the wind direction controller (113 in FIG. 1) and the air volume controller (114 in FIG. 1), based on indoor temperature and the like.

When the master image is available as a result of the determination in step 220, the control unit 112 (the calculation unit (1121 in FIG. 2) in the case of a control unit configured as illustrated in FIG. 2) may find indoor space information, based on the master image (S230). The indoor space information may include at least one or more pieces of information including the position (direction) of a vertical edge, the number of vertical edges, a distance between an air conditioner (an indoor unit in the case of a split air conditioner) and a vertical edge, the surface area of indoor space (specifically, the surface area of the floor of indoor space), the shape of indoor space, the position of an air conditioner (an indoor unit in the case of a split air conditioner) in indoor space, and a direction faced by an air conditioner (an indoor unit in the case of a split air conditioner). Specific procedures in step 230 are described below with reference to FIG. 5.

Then the control unit 112 (the calculation unit (1121 in FIG. 2) in the case of a control unit configured as illustrated in FIG. 2) may determine whether the indoor space information is available (S240). For example, the control unit 112 may obtain a plurality of images with the camera 111, repeat step 210 to step 230, based on each of the plurality of indoor space images obtained one after another, in multiple times, and determine that indoor space information is available when the indoor space information obtained one after another is identical, while determining that the indoor space information is not available when the indoor space information obtained one after another is not identical.

When the indoor space information is not available as a result of the determination in step 240, the control unit 112 (the calculation unit (1121 in FIG. 2) in the case of a control unit configured as illustrated in FIG. 2) may end the operation of finding the indoor space information. In this case, the control unit 112 (the main control unit (1122 in FIG. 2) in the case of a control unit configured as illustrated in FIG. 2) may control the wind direction controller (113 in FIG. 1) and the air volume controller (114 in FIG. 1), based on indoor temperature and the like.

When the indoor space information is available as a result of the determination in step 240, the control unit 112 (the calculation unit (1121 in FIG. 2) in the case of a control unit configured as illustrated in FIG. 2) may store the indoor space information (S250). In the case of a control unit configured as illustrated in FIG. 2, the calculation unit 1121 may provide the indoor space information to the main control unit 1122 in step 500.

Figure 5:
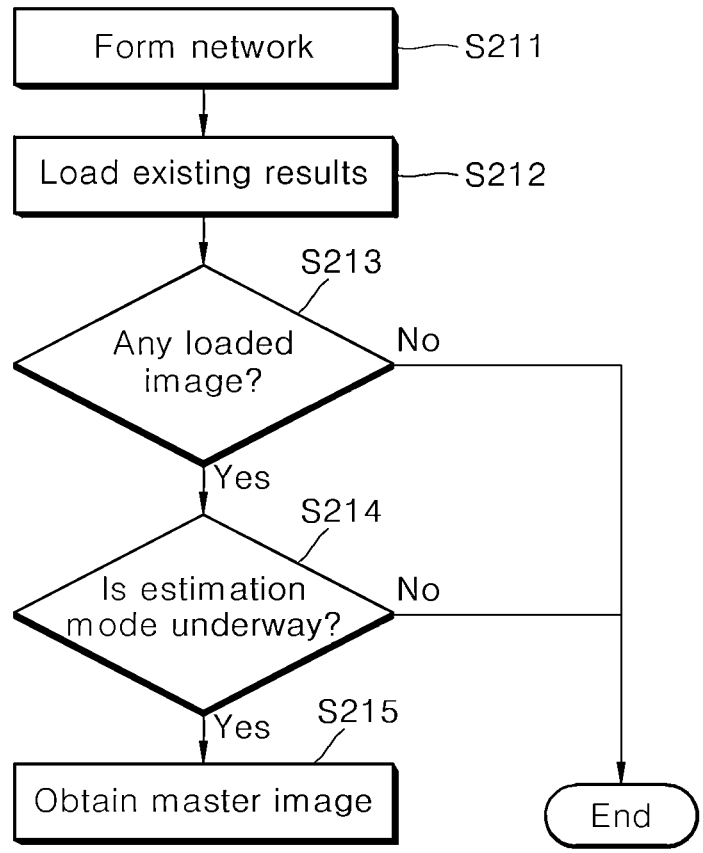
FIG. 5 is a process flowchart for describing an example of the step of obtaining a master image in the control method of an air conditioner in one embodiment.

FIG. 5 is a process flowchart for describing an example of the step (step 210 in FIG. 4) of obtaining a master image in the control method of an air conditioner in one embodiment. Each of the steps in FIG. 5 may be performed by the control unit 112 in FIG. 1 (the calculation unit (1121 in FIG. 2) in the case of a control unit 112 configured as illustrated in FIG. 2).

The control unit 112 (the calculation unit (1121 in FIG. 2) in the case of a control unit configured as illustrated in FIG. 2) may form a network to bring a trained model (S211). The network may include a neural network circuit for bringing a trained model. In this case, the control unit 112 (the calculation unit (1121 in FIG. 2) in the case of a control unit configured as illustrated in FIG. 2) may form the network as three layers of an encoder, a bridge and a decoder. The trained model may be trained based on deep learning that uses an image for training and data on the background, the ceiling, the walls and the floor of the image for training as input data. In one embodiment, with the trained model, a boundary between surfaces (e.g., an interwall boundary (a vertical edge), a boundary between a wall and the ceiling (an upper transverse edge), and a boundary between a wall and the floor (a lower transverse edge) in an image may be directly extracted. Step 211 may be performed when power is supplied to an air conditioner for the first time. Step 211 may be embodied in a way that a file is loaded, or embodied directly on a program.

Then the control unit 112 (the calculation unit (1121 in FIG. 2) in the case of a control unit configured as illustrated in FIG. 2) may load existing results (a master image) (S212).

Then the control unit 112 (the calculation unit (1121 in FIG. 2) in the case of a control unit configured as illustrated in FIG. 2) may determine whether there is an indoor space image provided by the camera (111 in FIG. 1 or 2) (S 213).

When there is no indoor space image provided as a result of the determination in step 213, the control unit 112 (the calculation unit (1121 in FIG. 2) in the case of a control unit configured as illustrated in FIG. 2) may end the procedure of finding indoor space information. That is, in one embodiment, when the control unit 112 (the calculation unit (1121 in FIG. 2) in the case of a control unit configured as illustrated in FIG. 2) cannot obtain an indoor space image from the camera due to an error of the camera, or for other reasons, the control unit 112 may end the procedure of finding indoor space information.

When there is an indoor space image provided as a result of the determination in step 213, the control unit 112 (the calculation unit (1121 in FIG. 2) in the case of a control unit configured as illustrated in FIG. 2) may determine whether an estimation mode in which indoor space information is found is being performed (S214).

If the estimation mode is not being performed as a result of the determination in step 214, the control unit 112 (the calculation unit (1121 in FIG. 2) in the case of a control unit configured as illustrated in FIG. 2) may end the procedure of founding indoor space information. That is, in one embodiment, the user may or may not execute the estimation mode in which indoor space information is found out, and when the user does not execute the estimation mode, the control unit 112 (the calculation unit (1121 in FIG. 2) in the case of a control unit configured as illustrated in FIG. 2) may end the procedure of finding indoor space information.

If the estimation mode is being performed as a result of the determination in step 214, the control unit 112 (the calculation unit (1121 in FIG. 2) in the case of a control unit configured as illustrated in FIG. 2) may input an indoor space image to the network formed in step 110 to obtain a master image (S215). In this case, the control unit 112 (the calculation unit (1121 in FIG. 2) in the case of a control unit configured as illustrated in FIG. 2) may reduce the size of the indoor space image to input the indoor space image to the network. For example, in the case of an indoor space image of 640×480, the control unit 112 (the calculation unit (1121 in FIG. 2) in the case of a control unit configured as illustrated in FIG. 2) may reduce the size (640×480) of the indoor space image to 128×96 to input the indoor space image to the network.

Figure 6:
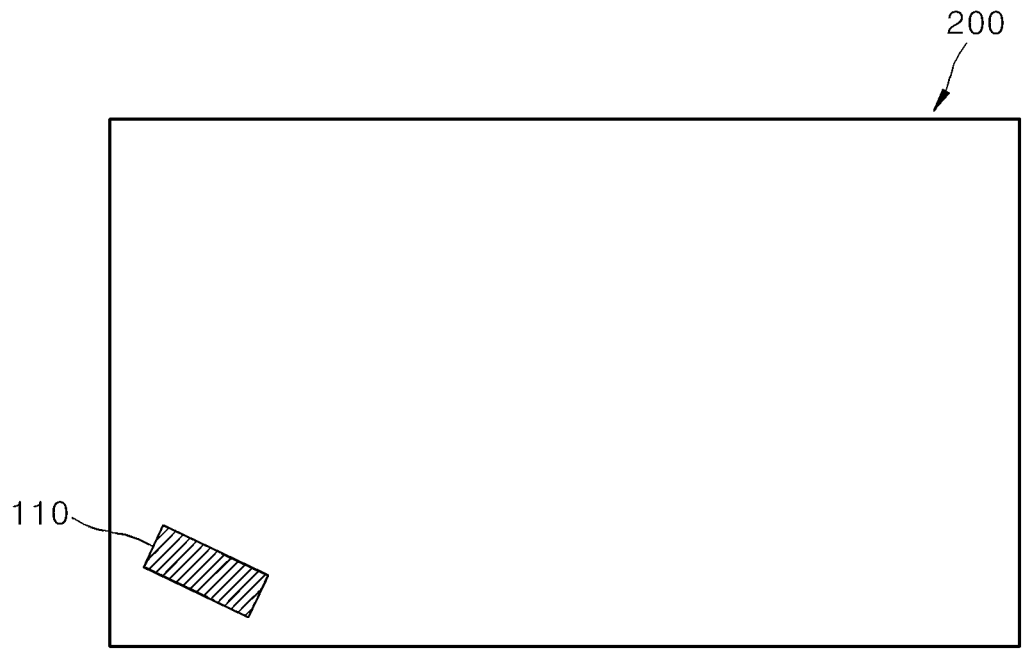
FIG. 6 is a view showing the air conditioner of one embodiment installed in an indoor space as an example.

FIG. 6 is a view showing the air conditioner of one embodiment installed in indoor space as an example, and a plan view of indoor space 200 seen from the ceiling. FIG. 7 is a view showing an example of a master image estimated based on an image obtained by the air conditioner of one embodiment in the state in which the air conditioner of one embodiment is installed as illustrated in FIG. 6.

When the air conditioner is installed in indoor space as illustrated in FIG. 6, an indoor space image obtained by the camera may be an image that is obtained toward the front, near the edge of the left lower side of the indoor space 200. When step 250 is performed in the state in which the air conditioner (an indoor unit 110 of a split air conditioner) is disposed as illustrated in FIG. 6, the master image illustrated in FIG. 7 may be obtained. In the master image of FIG. 7, the solid line 321, 322, 323 may be a vertical edge that is an interwall boundary, the dashed line 311, 312, 313 may be an upper transverse edge that is a boundary between a wall and the ceiling, and the dot dash line 331, 332, 333 may be a lower transverse edge that is a boundary between a wall and the floor. Unlike the master image of FIG. 7, a master image may be comprised of a vertical edge, an upper transverse edge and a lower transverse edge that have a different color.

Unlike the master image in FIG. 5, the master image in FIG. 7 may be obtained in a way that the control unit (112 in FIG. 1) (the calculation unit (1121 in FIG. 2) in the case of a control unit configured as illustrated in FIG. 2) of an air conditioner of one embodiment extracts boundary lines of the images by using a well-known algorithm for extracting a boundary line and the like.

Figure 8:
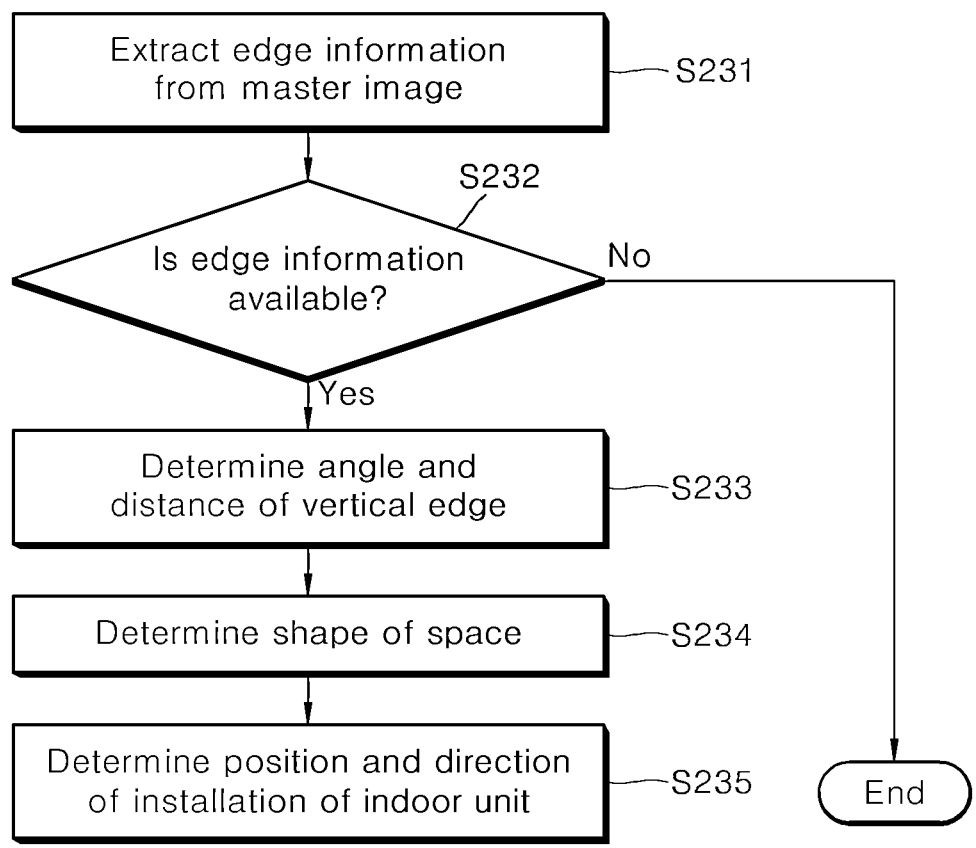
FIG. 8 is a process flowchart for describing an example of the step of obtaining indoor space information in the control method of an air conditioner in one embodiment.

FIG. 8 is a process flowchart for describing an example of the step (step 230 in FIG. 4) of obtaining indoor space information in the control method of an air conditioner in one embodiment. Each of the steps in FIG. 8 may be performed by the control unit 112 in FIG. 1 (the calculation unit (1121 in FIG. 2) in the case of a control unit 112 configured as illustrated in FIG. 2).

The control unit 112 (the calculation unit (1121 in FIG. 2) in the case of a control unit configured as illustrated in FIG. 2) may separate and extract edge information from the master image (S231). For example, the control unit 112 (the calculation unit (1121 in FIG. 2) in the case of a control unit configured as illustrated in FIG. 2) may separate a vertical edge, an upper transverse edge, and a lower transverse edge, respectively, from the master image. Additionally, the control unit 112 (the calculation unit (1121 in FIG. 2) in the case of a control unit configured as illustrated in FIG. 2) may extract one or more pieces of pixel information from the above edges. For example, the control unit 112 (the calculation unit (1121 in FIG. 2) in the case of a control unit configured as illustrated in FIG. 2) may extract pixel information of the vertical edge (e.g., coordinates values of pixels corresponding to the vertical edge and the like).

Then the control unit 112 (the calculation unit (1121 in FIG. 2) in the case of a control unit configured as illustrated in FIG. 2) may determine whether the extracted edge information is available (S232). For example, in the state in which there are a vertical edge, an upper transverse edge, and a lower transverse edge based on the extracted edge information, when there is no upper transverse edge connecting to the vertical edge or no lower transverse edge connecting to the vertical edge, the control unit 112 (the calculation unit (1121 in FIG. 2) in the case of a control unit configured as illustrated in FIG. 2) may determine that the extracted edge information is not available.

When the edge information is not available as a result of the determination in step 232, the control unit 112 (the calculation unit (1121 in FIG. 2) in the case of a control unit configured as illustrated in FIG. 2) may determine the indoor space found as space where the control unit 112 (the calculation unit (1121 in FIG. 2) in the case of a control unit configured as illustrated in FIG. 2) cannot find indoor space information, and end the inference procedure in which indoor space information is found out.

When the edge information is available as a result of the determination in step 232, the control unit 112 (the calculation unit (1121 in FIG. 2) in the case of a control unit configured as illustrated in FIG. 2) may determines an angle and a distance of each of the vertical edges (S233).

The angle of each of the vertical edges may be determined with coordinate values of pixels corresponding to each of the vertical edges. For example, the control unit 112 (the calculation unit (1121 in FIG. 2) in the case of a control unit configured as illustrated in FIG. 2) may set the x-axis coordinate value of pixels corresponding to a vertical edge 321 of the master image of FIG. 7, which is 0, to a first angle (e.g., 0 degrees) and set a maximum x-axis coordinate value to a second angle (e.g., 105 degrees), and then determine the angle (position) of the vertical edge 321 by calculating an angle corresponding to each of the coordinate values or referring to a predetermined table.

Additionally, the control unit 112 (the calculation unit (1121 in FIG. 2) in the case of a control unit configured as illustrated in FIG. 2) may determine a distance of each of the vertical edges, based on the height of indoor space, the number of pixels of the height of a vertical edge (i.e., the number of y-axis pixels in the master image of FIG. 7), and the position (angle) of a vertical edge. For example, the control unit 112 (the calculation unit (1121 in FIG. 2) in the case of a control unit configured as illustrated in FIG. 2) may determine a distance to a vertical edge by finding the height of indoor space, the number of pixels of the height of a vertical edge (i.e., the number of y-axis pixels in the master image of FIG. 7), and an angle of a vertical edge in the pre-stored table. The height of indoor space may be input by the user.

Depending on embodiments, the control unit 112 (the calculation unit (1121 in FIG. 2) in the case of a control unit configured as illustrated in FIG. 2) may find the surface area of indoor space (e.g., the surface area of the floor of indoor space) by using the master image. The method of finding the surface area of indoor space is specifically described below with reference to FIGS. 9 and 10.

Then the control unit 112 (the calculation unit (1121 in FIG. 2) in the case of a control unit configured as illustrated in FIG. 2) may determine the shape of indoor space (S234). For example, the control unit 112 (the calculation unit (1121 in FIG. 2) in the case of a control unit configured as illustrated in FIG. 2) may select two upper transverse edges, which contact each other, out of the upper transverse edges, and if the selected upper transverse edges have the same length, may determine that the indoor space has a square shape. The lengths of the upper transverse edges may be calculated based on triangulation. Further, the control unit 112 (the calculation unit (1121 in FIG. 2) in the case of a control unit configured as illustrated in FIG. 2) may determine that indoor space has a rectangle shape when there are one or more of vertical edges, when the vertical edge connects to the ceiling and the floe, and when the indoor space does not have a square shape. Furthermore, the control unit 112 (the calculation unit (1121 in FIG. 2) in the case of a control unit configured as illustrated in FIG. 2) may categorize shapes except for a square and a rectangle into other shapes.

Then the control unit 112 (the calculation unit (1121 in FIG. 2) in the case of a control unit configured as illustrated in FIG. 2) may determine the position of installation of an air conditioner, and a direction faced by the air conditioner (S235). In this case, the control unit 112 (the calculation unit (1121 in FIG. 2) in the case of a control unit configured as illustrated in FIG. 2) may determine the position and the direction of installation of an air conditioner by using the lengths and positions of vertical edges. For example, the control unit 112 (the calculation unit (1121 in FIG. 2) in the case of a control unit configured as illustrated in FIG. 2) may determine that an air conditioner is mounted on a wall (i.e. near the center of the surface of a wall) when there are two vertical edges and when a difference in the lengths of the two vertical edges is a predetermined value or less. Alternatively, the control unit 112 (the calculation unit (1121 in FIG. 2) in the case of a control unit configured as illustrated in FIG. 2) may determine that an air conditioner is disposed at an edge (a corner) when there are one or three vertical edges or there are two vertical edges, and when a difference in the lengths of the two vertical edges is greater than a predetermined value. Additionally, when determining that the air conditioner is at a corner, the control unit 112 (the calculation unit (1121 in FIG. 2) in the case of a control unit configured as illustrated in FIG. 2) may determine that the air conditioner faces a wall on the right side if the shortest vertical edge of the vertical edges is on the left side of the master image while determining that the air conditioner faces a wall on the left side if the shortest vertical edge of the vertical edges is on the right side of the master image.

Depending on embodiments, the control unit 112 (the calculation unit (1121 in FIG. 2) in the case of a control unit configured as illustrated in FIG. 2) may find the position of the air conditioner by using the number of vertical edges. Specifically, when there are three vertical edges in an indoor structure image, the control unit 112 (the calculation unit (1121 in FIG. 2) in the case of a control unit configured as illustrated in FIG. 2) may determine that the air conditioner is at a corner of indoor space. Alternatively, when there are two vertical edges in an indoor structure image, the control unit 112 (the calculation unit (1121 in FIG. 2) in the case of a control unit configured as illustrated in FIG. 2) may determine that the air conditioner is on a wall of indoor space.

In the present disclosure, when the air conditioner is on a wall of indoor space, it means that the air conditioner is closer to the center of the wall of the indoor space than to a corner of the indoor space.

When the control unit 112 (the calculation unit (1121 in FIG. 2) in the case of a control unit configured as illustrated in FIG. 2) is configured as described above, the control unit 112 (the calculation unit (1121 in FIG. 2) in the case of a control unit configured as illustrated in FIG. 2) may find the size of the indoor space by using a master image the same as the master image illustrated in FIG. 7. In this case, the size of the indoor space may denote the surface area of the floor of the indoor space. To estimate the size of the floor of the indoor space, the control unit 112 (the calculation unit (1121 in FIG. 2) in the case of a control unit configured as illustrated in FIG. 2) may divide the master image into cells of a predetermined size. Then the control unit 112 may find the surface area of the floor of the indoor space, based on the divided mater image and the height of the indoor space.

Figure 10:
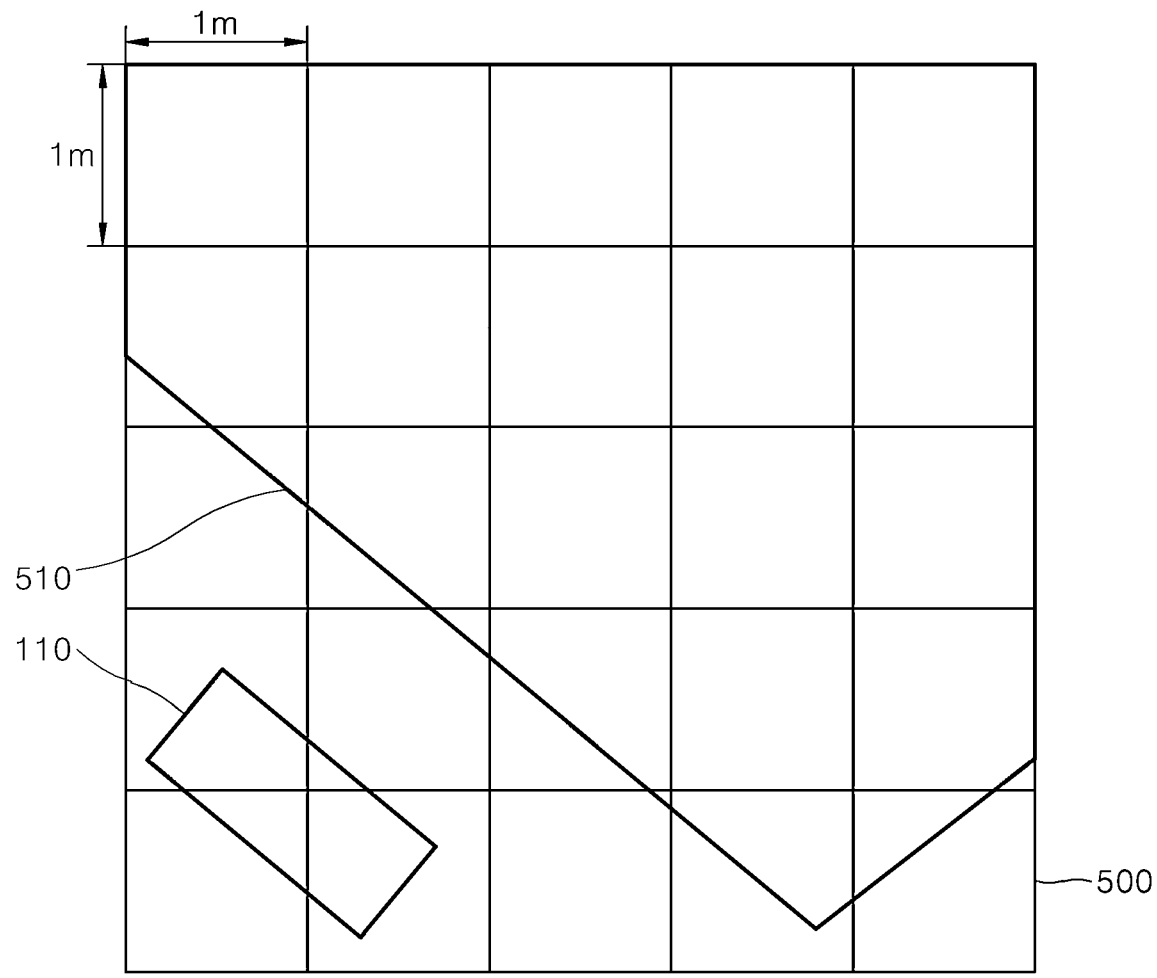
FIG. 10 is a view showing an example of a floor structure image restored at an actual rate in the image of FIG. 9.

FIG. 9 is a view showing an example of the master image in FIG. 7 divided into cells of a predetermined size, and FIG. 10 is a view showing an example of a floor structure image restored at an actual rate in the image of FIG. 9.

Hereafter, the method in which the control unit 112 (the calculation unit (1121 in FIG. 2) in the case of a control unit configured as illustrated in FIG. 2) of the air conditioner 100 of one embodiment finds the size of indoor space (e.g., the surface area of the floor of indoor space) is described with reference o FIGS. 9 and 10.

The control unit 112 (the calculation unit (1121 in FIG. 2) in the case of a control unit configured as illustrated in FIG. 2) of the air conditioner 100 may divide the walls and the floor of the indoor space in the master image of FIG. 7 into cells of a predetermined size, to obtain a divided mater image the same as the divided master image of FIG. 9.

FIG. 9 shows that the walls and the floor in the divided master image are divided and expressed as cells of a predetermined size. In this case, the cells may be set to a rectangle but not limited.

The predetermined size may be set considering the height of the indoor space. For example, when the indoor space has a height of 2 m and when the cells have a rectangle shape, the predetermined size may be set to 1 m² that is the size of a square having a side which is one meter long and is half the height of the indoor space. Alternatively, the predetermined size may be set to 0.25 m² that is the size of a square having a side which is 0.5 m long and is one fourth of the height of the indoor space.

The control unit 112 (the calculation unit (1121 in FIG. 2) in the case of a control unit configured as illustrated in FIG. 2) may adjust the predetermined size, to adjust accuracy in estimation of the surface area of the floor of indoor space and calculation speed. Specifically, the control unit 112 may increase the predetermined size and increase the calculation speed while decreasing the accuracy in estimation of the surface area of the floor. Alternatively, the control unit 112 may decrease the predetermined size and decrease the calculation speed while increasing the accuracy in estimation of the surface area of the floor.

In this case, the length of the interwall boundary 321, 322, 323, which needs to be the same as the height of the indoor space, may not be constant due to a difference in the distance between the camera 111 of the air conditioner 100 and the interwall boundary 321, 322, 323, on the indoor structure image, although the height of the indoor space is constant. Considering the fact, the control unit 112 may divide the master image of FIG. 7 when dividing the master image into cells of a predetermined size.

When dividing the master image of FIG. 7 into cells of a predetermined size, the air conditioner 100 (e.g., a split air conditioner) may divide the interwall boundary (i.e., a vertical edge) 321, 322, 323 into two (or four), considering a distance between the indoor unit 110 and indoor structures. Additionally, the air conditioner 100 may divide the boundary 312 between the ceiling and a wall and the boundary 313 between the ceiling and a wall, based on the division of a vertical edge. In the embodiment, the boundary 312 between the ceiling and a wall may be divided into five, and the boundary 313 between the ceiling and a wall may be divided into four (see FIG. 9).

In the embodiment, the height of indoor space may be a height that is set considering the ordinary height of indoor space. For example, the height of the indoor space may be previously set to one of the values between 2.4 m and 2.7 m.

Alternatively, the height of the indoor space may be a height received from the user. As the height of the indoor space is received from the user, accuracy in the estimation of the surface area of the floor of the indoor space may improve. To this end, the control unit 112 (the calculation unit (1121 in FIG. 2) in the case of a control unit configured as illustrated in FIG. 2) may receive the height of the indoor space from the user before estimating the surface area of the floor of the indoor space.

Then the control unit 112 (the calculation unit (1121 in FIG. 2) in the case of a control unit configured as illustrated in FIG. 2) may obtain a floor structure image in which the structure of the floor in the divided master image of FIG. 9 is restored at an actual ratio, referring to FIG. 10. In the embodiment, the shape of the floor, estimated based on the indoor structure image, is indicated by 510. The air conditioner 100 (an indoor unit 110 of a split air conditioner) may be disposed in a position displayed on the floor structure image 500 of FIG. 10.

Under the assumption that the predetermined size is 1 m² that is the surface area of a square having a side which is one meter long, the control unit 112 may calculate the surface area of the floor of the indoor space as about 17.07 m² by using the image of FIG. 10.

Based on the above method, the control unit 112 (the calculation unit (1121 in FIG. 2) in the case of a control unit configured as illustrated in FIG. 2) may find the surface area of the floor of the indoor space.

Figure 11:
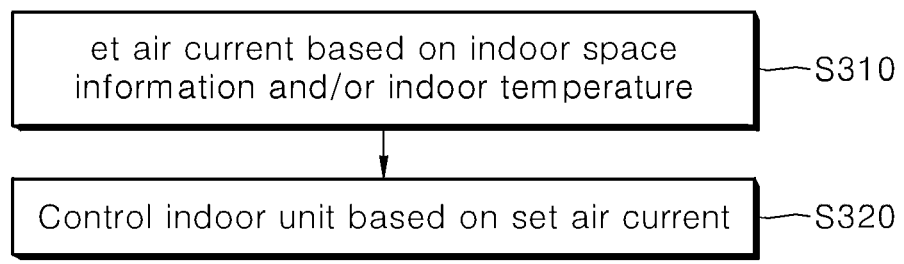
FIG. 11 is a process flowchart for describing an example of the step of controlling an air conditioner in the control method of an air conditioner in one embodiment.

FIG. 11 is a process flowchart for describing an example of the step (step 300 in FIG. 3) of controlling an air conditioner in the control method of an air conditioner in one embodiment. Each of the steps in FIG. 11 may be performed by the control unit 112 in FIG. 1 (the main control unit (1122 in FIG. 2) in the case of a control unit 112 configured as illustrated in FIG. 2).

The control unit 112 (the main control unit (1122 in FIG. 2) in the case of a control unit 112 configured as illustrated in FIG. 2) may set an air current, based on indoor space information and/or indoor temperature (S310). The air current may be the flow of air being discharged from the discharge outlet. For example, the control unit 112 may set at least one or more of air currents, based on indoor space information. Additionally, the control unit 112 may select a proper air current depending on a difference between indoor temperature and target temperature after setting a plurality of air currents. Depending on embodiments, the control unit 112 may set the direction and intensity of the air current. For example, the control unit 112 may set the intensity of the air current, based on indoor space information or a difference between indoor temperature and target temperature or the sort of the selected air current. The intensity of the air current may be the volume of air being discharged from the discharge outlet or the intensity of wind being discharged from the discharge outlet. The intensity of the air current may the amount of air or the intensity of wind being discharged from the discharge outlet. The method in which the control unit 112 sets an air current (i.e., the direction and/or the amount of air being discharged) is described hereafter with reference to FIGS. 12 to 18.

Then the control unit 112 (the main control unit (1122 in FIG. 2) in the case of a control unit configured as illustrated in FIG. 2) may control the air conditioner (an indoor unit in the case of a split air conditioner), based on the set air current (S320). For example, the control unit 112 may properly control the wind direction controller (113 in FIG. 1) and/or the air volume controller (114 In FIG. 1) such that air in the set air current is discharged from the air conditioner 100 (an indoor unit 110 of a split air conditioner). In step 320, when receiving an instruction from the user, the control unit 112 (the main control unit (1122 in FIG. 2) in the case of a control unit configured as illustrated in FIG. 2) may adjust an air current, based on the received instruction.

Figure 12:
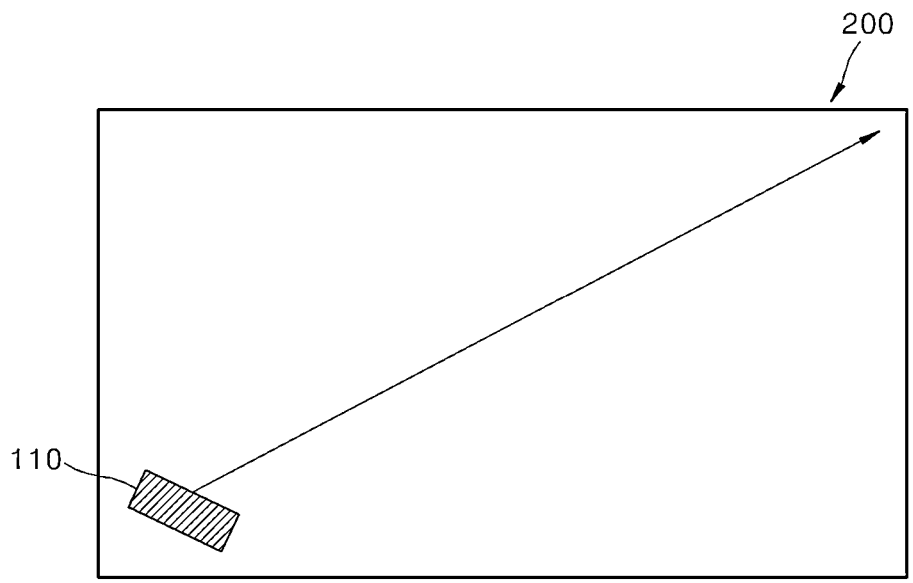
FIG. 12 is a view showing an example of high-speed air currents in the state in which the air conditioner of one embodiment is installed as illustrated in FIG. 6.
Figure 13:
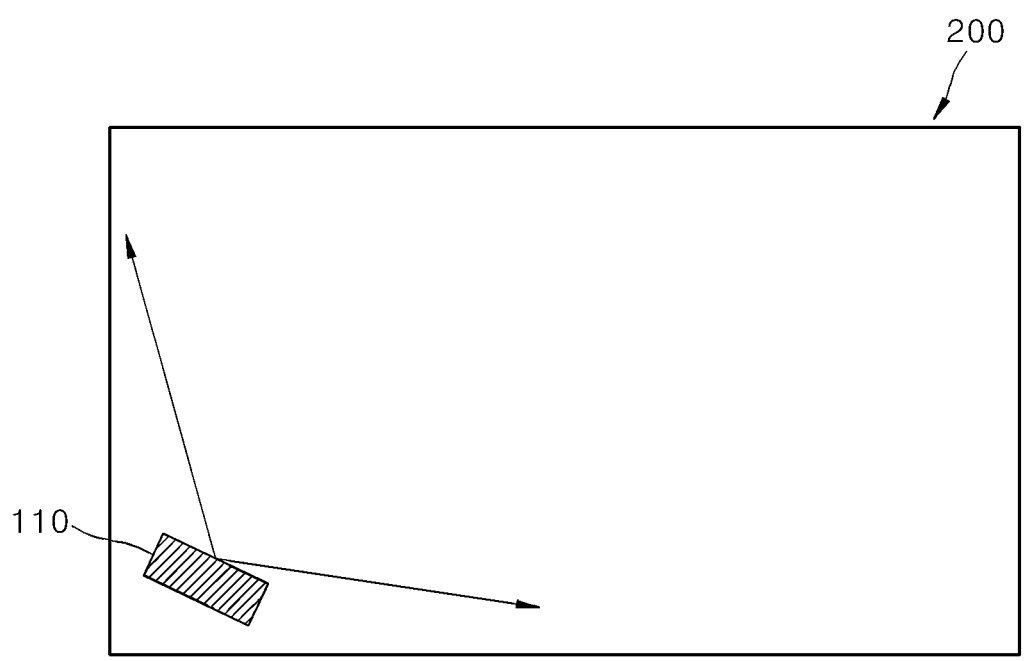
FIG. 13 is a view showing an example of comfortable air currents in the state in which the air conditioner of one embodiment is installed as illustrated in FIG. 6.

FIG. 12 is a view showing an example of high-speed air currents in the state in which the air conditioner (an indoor unit 110 in the case of a split air conditioner) of one embodiment is installed as illustrated in FIG. 6, and FIG. 13 is a view showing an example of comfortable air currents in the state in which the air conditioner (an indoor unit 110 in the case of a split air conditioner) of one embodiment is installed as illustrated in FIG. 6.

The control unit 112 (the main control unit (1122 in FIG. 2) in the case of a control unit configured as illustrated in FIG. 2) may set a high-speed air current and a comfortable air current, based on indoor space information. Specifically, the control unit 112 (the main control unit (1122 in FIG. 2) in the case of a control unit configured as illustrated in FIG. 2) may set a high-speed air current and a comfortable air current, based on information on the structure of indoor space and/or information on the position of the air conditioner (an indoor unit 110 in the case of a split air conditioner) in indoor space, among pieces of indoor space information. The high-speed air current may be an air current that allows the temperature of indoor space to reach a target temperature rapidly, and the comfortable air current may be an air current that helps to improve the temperature distribution of indoor space rapidly.

The high-speed air current, as illustrated in FIG. 12, may be an air current in which air is discharged toward a vertical edge farthest from the air conditioner (an indoor unit 110 in the case of a split air conditioner) among vertical edges in indoor space. The control unit 112 (the main control unit (1122 in FIG. 2) in the case of a control unit configured as illustrated in FIG. 2) may determine a vertical edge having a shortest length among vertical edges as a vertical edge farthest from the air conditioner (an indoor unit 110 in the case of a split air conditioner). Since air is discharged as described above, the discharged air may proceed without hitting a wall and increase a cooling speed.

Depending on embodiments, the control unit 112 (the main control unit (1122 in FIG. 2) in the case of a control unit configured as illustrated in FIG. 2) may set the intensity of an air current to a maximum level when the air conditioner discharges air in a high-speed air current. Accordingly, the temperature of indoor space may reach a target temperature more rapidly.

Depending on embodiments, the control unit 112 (the main control unit (1122 in FIG. 2) in the case of a control unit configured as illustrated in FIG. 2) may set the intensity of an air current to a predetermined value, based on the size of indoor space (e.g., a distance from the air conditioner to a farthest vertical edge or the surface area of the floor of indoor space) when the air conditioner discharges air in the high-speed air current. Accordingly, efficient cooling or heating may be ensured.

The comfortable air current, as illustrated in FIG. 13, may be an air current in which air is discharged toward vertical edges on the left and the right except for a vertical edge farthest from the air conditioner (an indoor unit 110 in the case of a split air conditioner) among vertical edges in indoor space. Alternatively, the comfortable air current may be an air current in which air is discharged toward a leftmost vertical edge and a rightmost vertical edge among vertical edges in indoor space. Since the air is discharged as described above, cool air may circulate while surrounding the indoor space, and as a result, the uniform distribution of temperature in the indoor space may be ensured. Additionally, with the above-described flow of air, the temperature sensor being mounted onto the indoor unit may react rapidly, resulting in a reduction in the deviation between an actual temperature and a measured temperature. Thus, the operation time of a compressor of the air conditioner (an outdoor unit in the case of a split air conditioner) may decrease, leading to a reduction in power consumption.

Depending on embodiments, the intensity of a comfortable air current may be adjusted based on the size of indoor space. For example, in the embodiment of FIG. 8, the amount of air being discharged toward a vertical edge in a relatively adjacent position may be less than the amount of air being discharged toward a vertical edge in a relatively far position.

FIGS. 14 to 17 are views for describing a high-speed air current based on the position of installation of the air conditioner of one embodiment, and FIGS. 18 to 21 are views for describing a comfortable air current based on the position of installation of the air conditioner of one embodiment.

Figure 14:
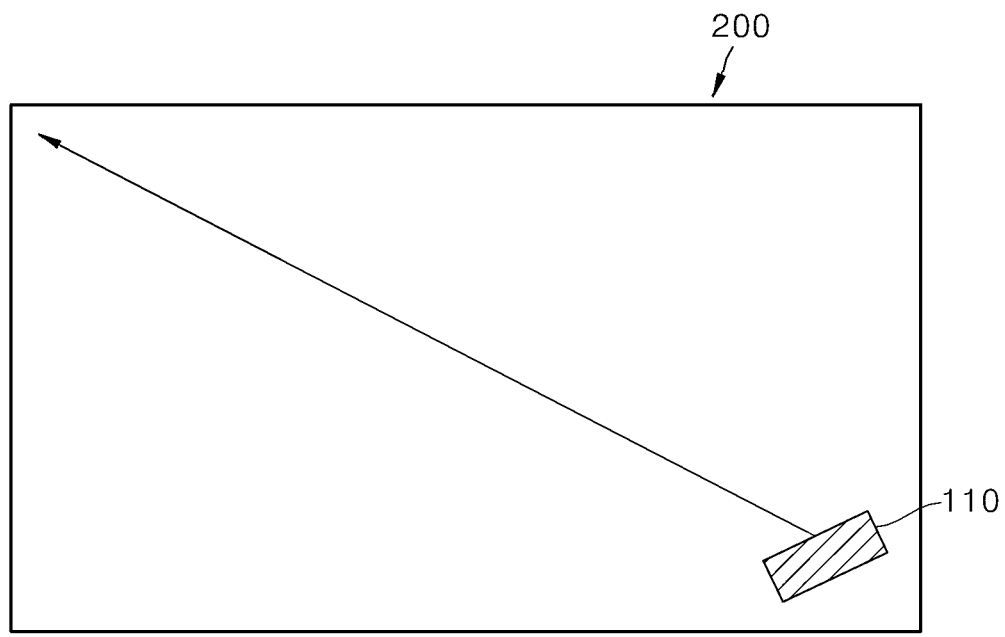
FIGS. 14 to 17 are views for describing a high-speed air current based on the position of installation of the air conditioner of one embodiment.
Figure 16:
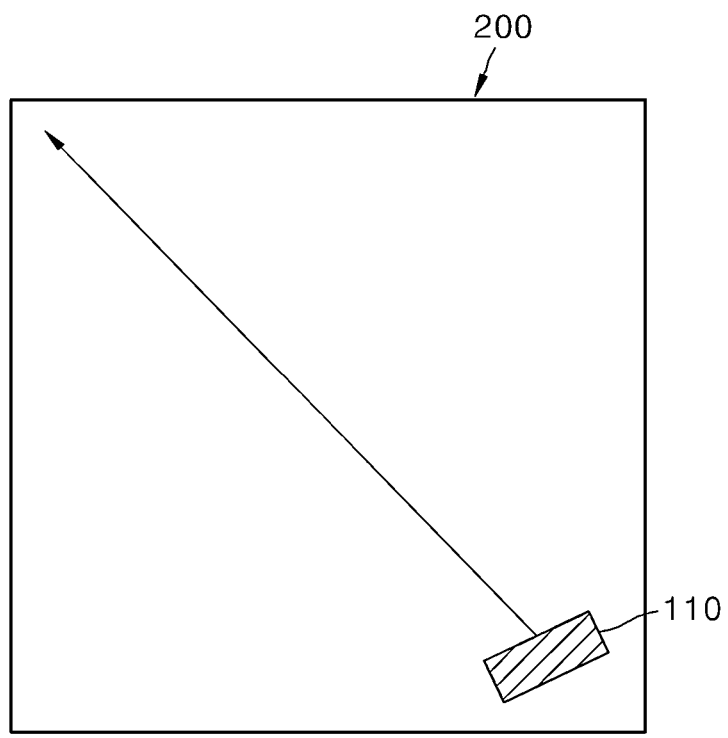

As illustrated in FIGS. 14 and 16, when the air conditioner (an indoor unit 110 in the case of a split air conditioner) is near a corner of indoor space 200, the high-speed air current may be an air current in which air is discharged toward a farthest vertical edge among vertical edges in indoor space. For example, the control unit 112 (the main control unit (1122 in FIG. 2) in the case of a control unit configured as illustrated in FIG. 2) may set an air current in which air is discharged toward a shortest vertical edge among vertical edges as the high-speed air current, when the control unit (112 in FIG. 1) (the calculation unit (1121 in FIG. 2) in the case of a control unit configured as illustrated in FIG. 2) analyzes an image obtained by the camera of the air conditioner and determines that the air conditioner (an indoor unit 110 in the case of a split air conditioner) is near a corner of indoor space 200.

Figure 15:
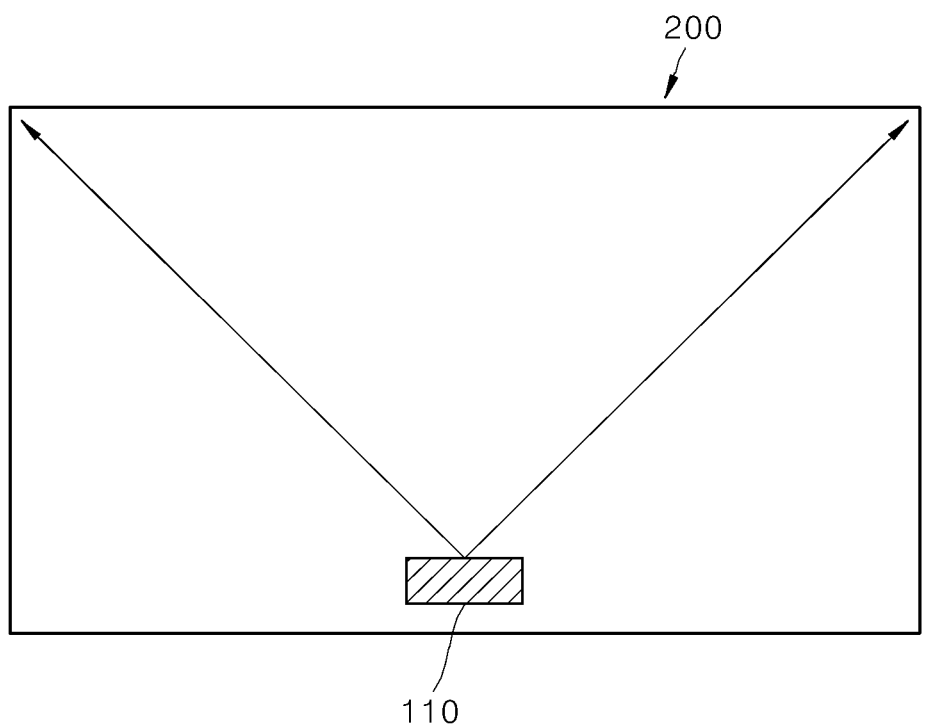
Figure 17:
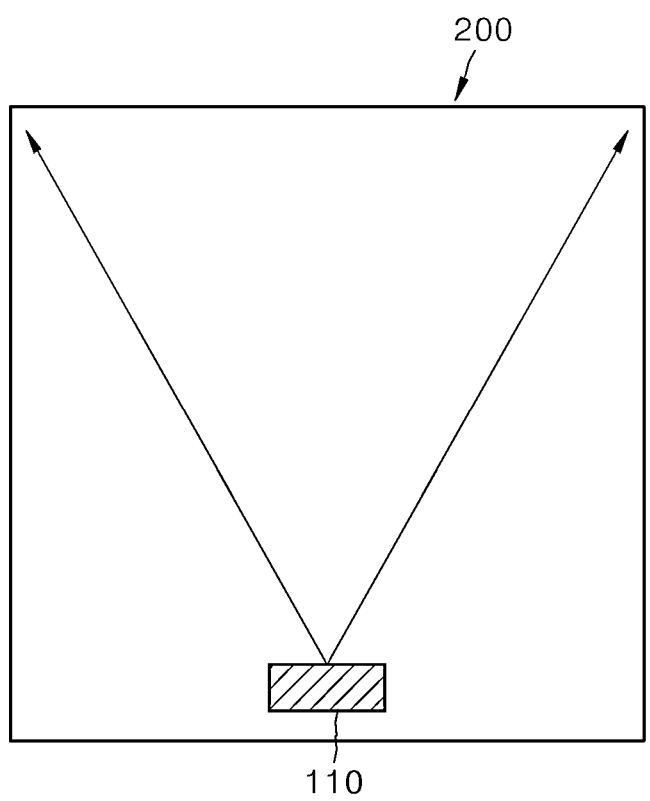

As illustrated in FIGS. 15 and 17, when the air conditioner (an indoor unit 110 in the case of a split air conditioner) is disposed on a wall of indoor space 200, the high-speed air current may be an air current in which air is discharged toward vertical edges in the indoor space. For example, the control unit 112 (the main control unit (1122 in FIG. 2) in the case of a control unit configured as illustrated in FIG. 2) may set an air current in which air is discharged toward two vertical edges at both sides of a wall on the opposite side of the air conditioner (an indoor unit 110 in the case of a split air conditioner) as the high-speed air current, when the control unit (112 in FIG. 1) (the calculation unit (1121 in FIG. 2) in the case of a control unit configured as illustrated in FIG. 2) analyzes an image obtained by the camera of the air conditioner and determines that the air conditioner (an indoor unit 110 in the case of a split air conditioner) is on a wall of indoor space 200.

Referring to FIGS. 18 to 21, the comfortable air current may be an air current in which air in the comfortable air current is discharged further leftward and rightward than in the high-speed air current. That is, under the assumption that an angle formed between the direction in which the air conditioner (an indoor unit 110 in the case of a split air conditioner) faces and the direction in which air is discharged in the high-speed air current is a first angle, an angle formed between the direction in which the air conditioner (an indoor unit 110 in the case of a split air conditioner) faces and the direction in which air is discharged in the comfortable air current may be a second angle greater than the first angle.

Figure 18:
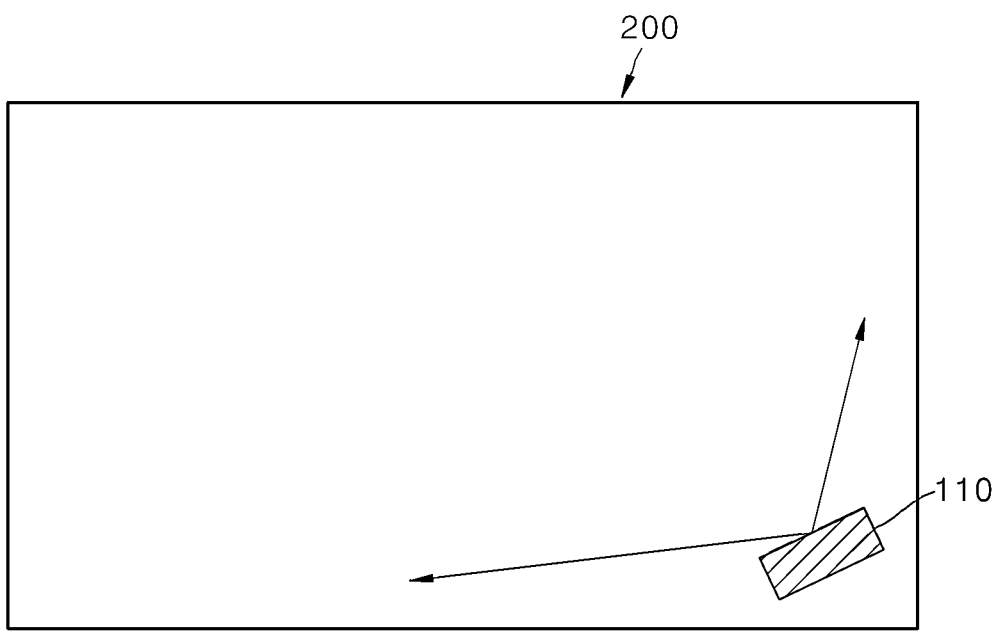
FIGS. 18 to 21 are views for describing a comfortable air current based on the position of installation of the air conditioner of one embodiment.
Figure 20:
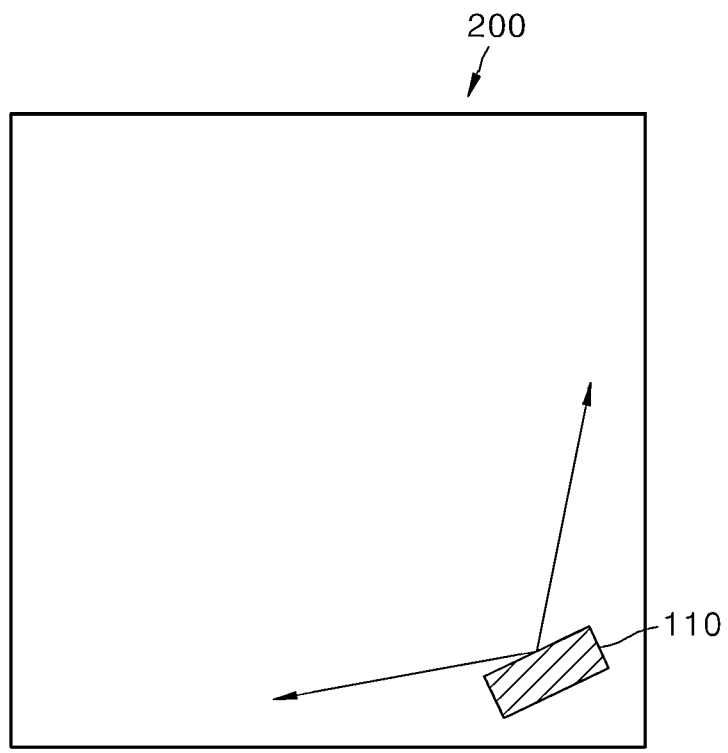

When the air conditioner (an indoor unit 110 in the case of a split air conditioner) is near a corner of indoor space 200 as illustrated in FIGS. 18 and 20, the comfortable air current may be an air current in which air is discharged toward vertical edges on the left and the right of a farthest vertical edge among vertical edges in the indoor space. For example, when the control unit (112 in FIG. 1) (the calculation unit (1121 in FIG. 2) in the case of a control unit configured as illustrated in FIG. 2) analyzes an image obtained by the camera of the air conditioner and determines that the air conditioner (an indoor unit 110 in the case of a split air conditioner) is near a corner of indoor space 200, the control unit 112 (the main control unit (1122 in FIG. 2) in the case of a control unit configured as illustrated in FIG. 2) may set an air current in which air is discharged toward a vertical edge on the left side of a shortest vertical edge and a vertical edge on the right side of the shortest vertical edge as the comfortable air current.

Figure 19:
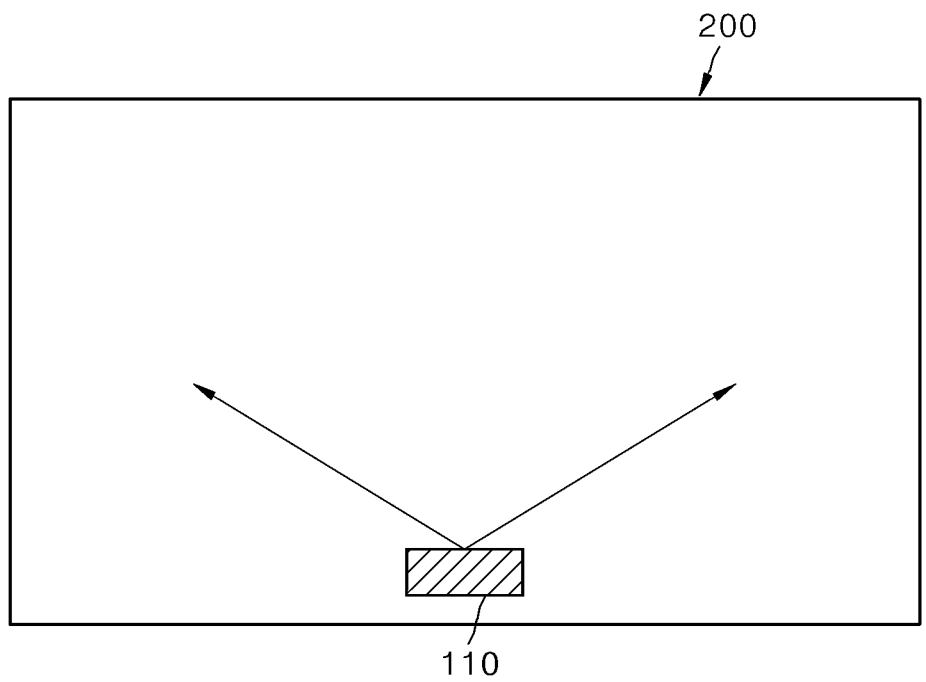
Figure 21:
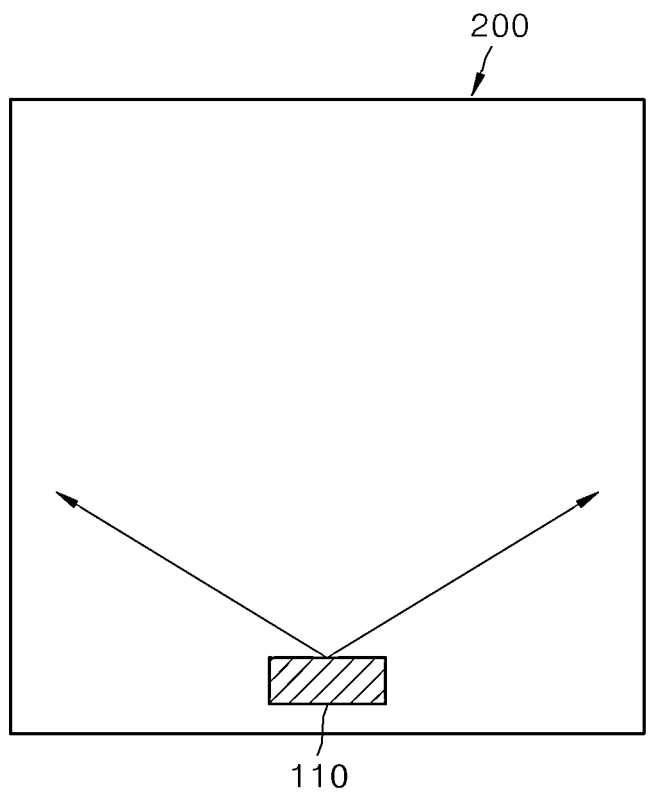

When the air conditioner (an indoor unit 110 in the case of a split air conditioner) is on a wall of indoor space 200 as illustrated in FIGS. 19 and 21, the comfortable air current may be an air current in which air is discharged toward the leftmost side and the rightmost side. For example, when the control unit (112 in FIG. 1) (the calculation unit (1121 in FIG. 2) in the case of a control unit configured as illustrated in FIG. 2) analyzes an image obtained by the camera of the air conditioner and determines that the air conditioner (an indoor unit 110 in the case of a split air conditioner) is on a wall of indoor space 200, the control unit 112 (the main control unit (1122 in FIG. 2) in the case of a control unit configured as illustrated in FIG. 2) may set each of the air currents in which air is discharged toward the leftmost side and the rightmost side to the comfortable air current.

Depending on embodiments, the control unit 112 (the calculation unit (1121 in FIG. 2) in the case of a control unit configured as illustrated in FIG. 2) may determine a position in which the air conditioner (an indoor unit in the case of a split air conditioner) is installed using the method described with reference to FIG. 8, or determine a position in which the air conditioner (an indoor unit in the case of a split air conditioner) is installed based on the number of vertical edges of a master image. For example, when there are three vertical edges, the control unit 112 (the calculation unit (1121 in FIG. 2) in the case of a control unit configured as illustrated in FIG. 2) may determine that the air conditioner (an indoor unit in the case of a split air conditioner) is near a corner of indoor space, and when there are two vertical edges, the control unit 112 may determine that the air conditioner (an indoor unit in the case of a split air conditioner) is on a wall of indoor space. In the present disclosure, when the air conditioner (an indoor unit in the case of a split air conditioner) is near a corner of indoor space, it may mean the air conditioner (an indoor unit in the case of a split air conditioner) is closer to a corner than to the central portion of a wall, and when the air conditioner (an indoor unit in the case of a split air conditioner) is on a wall, it may mean the air conditioner (an indoor unit in the case of a split air conditioner) is closer to the central portion of a wall than to a corner.

Referring to FIGS. 14 to 21, the high-speed air current may include an air current in which air is discharged toward a vertical edge farthest from the air conditioner among a plurality of vertical edges. Specifically, when the air conditioner is at a corner of indoor space, the high-speed air current may be an air current in which air is discharged toward a vertical edge farthest from the air conditioner among a plurality of vertical edges. When the air conditioner is on a wall of indoor space, the high-speed air current may include an air current in which air is discharged toward a vertical edge farthest from the air conditioner among a plurality of vertical edges and an air current in which air is discharged toward a vertical edge adjacent to the vertical edge farthest from the air conditioner.

Depending on embodiments, the control unit (112 in FIG. 1) may set a high-speed air current based on the length of a vertical edge. For example, when a difference in the lengths of vertical edges is a reference value or less, the high-speed air current may be an air current in which air is discharged toward each of the plurality of vertical edges, and when a difference in the lengths of vertical edges is greater than the reference value, the high-speed air current may be an air current in which air is discharged toward a shortest vertical edge. In this case, among the vertical edges, two shortest vertical edges may only be considered or all the vertical edges may be considered. For example, suppose that three vertical edges are detected and that the lengths of the vertical edges increase in the order of a first vertical edge, a second vertical edge and a third vertical edge. When a difference in the lengths of the first vertical edge and the second vertical edge is the reference value or less, the high-speed air current may include an air current in which air is discharged toward the first vertical edge and an air current in which is air is discharged toward the second vertical edge. When a difference in the lengths of the first vertical edge and the second vertical edge is greater than the reference value, the high-speed air current may be an air current in which air is discharged toward the first vertical edge. The above-described method may be also applied when two vertical edges are detected.

Referring to FIGS. 14 to 21, the comfortable air current may include an air current in which air is discharged in a first direction toward the left from the direction in which air in the high-speed air current is discharged and an air current in which air is discharged in a second direction toward the right from the direction in which air in the high-speed air current is discharged. That is, the comfortable air current may be air currents in which air is discharged in the first direction and the second direction. Specifically, when the air conditioner is at a corner of indoor space, the comfortable air current may include an air current in which air is discharged toward a leftmost vertical edge among a plurality of vertical edges and an air current in which air is discharged toward a rightmost vertical edge among the plurality of vertical edges. Additionally, when the air conditioner is on a wall of indoor space, the comfortable air current may include an air current in which air is discharged toward the leftmost side from the air conditioner and an air current in which air is discharged toward the rightmost side from the air conditioner.

Depending on embodiments, the control unit (112 in FIG. 1) may set a comfortable air current based on the length of a vertical edge. For example, when a difference in the lengths of vertical edges is a reference value or less, the comfortable air current may include an air current in which air is discharged toward the leftmost side from the air conditioner and an air current in which air is discharged toward the rightmost side from the air conditioner. When a difference in the lengths of vertical edges is greater than the reference value, the comfortable air current may include an air current in which air is discharged toward the right side of a shortest vertical edge and an air current in which air is discharged toward the left side of the shortest vertical edge. In this case, two shortest vertical edges among the vertical edges may only be considered or all the vertical edges may be considered.

Suppose that three vertical edges are detected, that the lengths of a first vertical edge, a second vertical edge and a third vertical edge increase in the order of the first vertical edge, the second vertical edge and the third vertical edge, that the second vertical edge is on the right side of the first vertical edge and that the third vertical edge is on the left side of the first vertical edge. When a difference in the lengths of the first vertical edge and the second vertical edge is the reference value or less, the comfortable air current may include an air current in which air is discharged toward the third vertical edge, and an air current in which air is discharged toward the right side of the second vertical edge. When a difference in the lengths of the first vertical edge and the second vertical edge is greater than the reference value, the comfortable air current may include an air current in which air is discharged toward the second vertical edge and an air current in which air is discharged toward the third vertical edge.

The above-described method may be applied in a similar way even when two vertical edges are detected. For example, suppose that two vertical edges are detected, that the length of a first vertical edge is less than the length of a second vertical edge, and that the second vertical edge is on the right side of the first vertical edge. When a difference in the lengths of the first vertical edge and the second vertical edge is the reference value or less, the comfortable air current may include an air current in which air is discharged toward the left side of the first vertical edge, and an air current in which air is discharged toward the right side of the second vertical edge. When a difference in the lengths of the first vertical edge and the second vertical edge is greater than the reference value, the comfortable air current may include an air current in which air is discharged toward the left side of the first vertical edge, and an air current in which air is discharged toward the second vertical edge.

Figure 22:
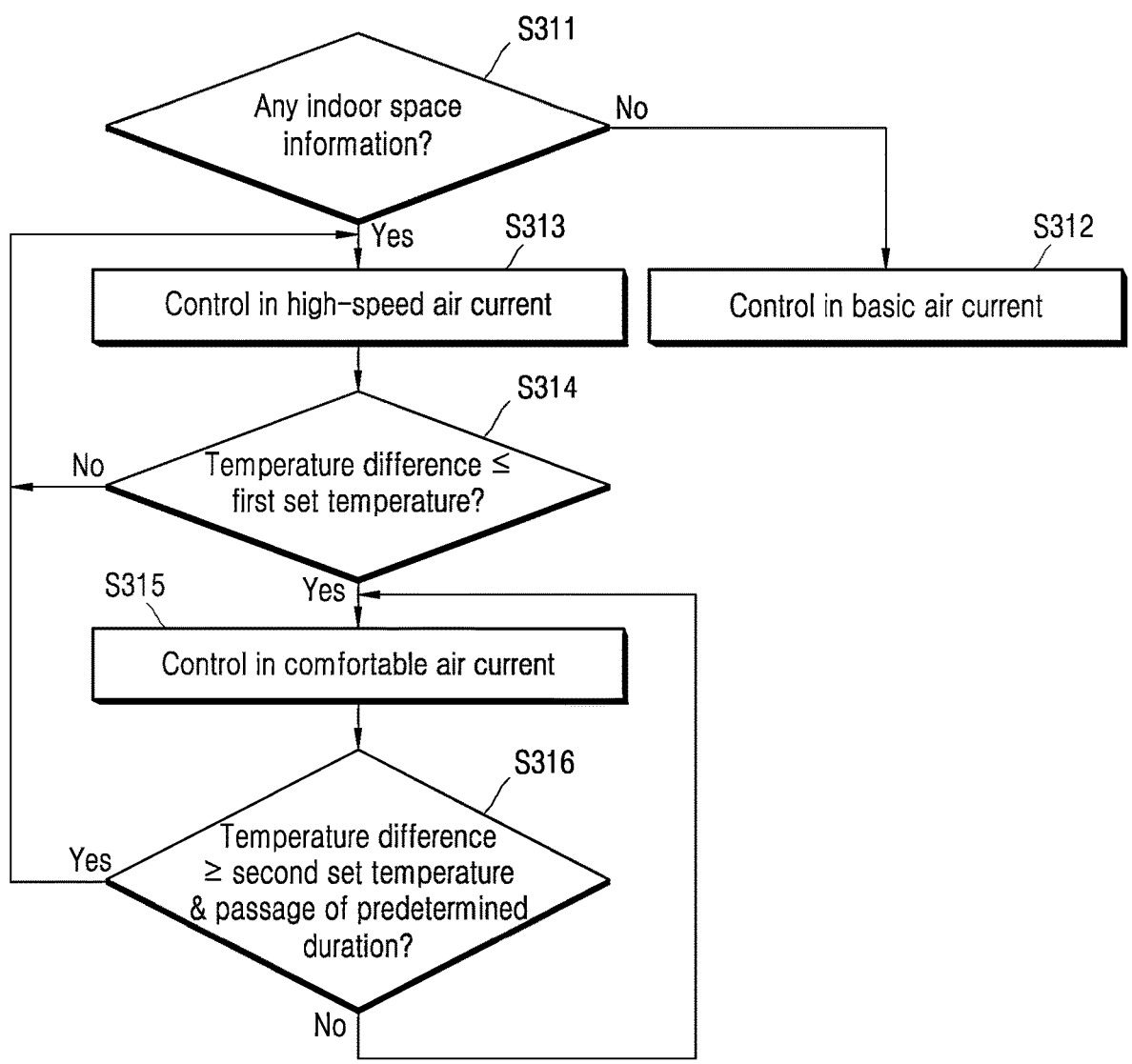
FIG. 22 is a processing flowchart for describing the step of setting an air current in the control method of an air conditioner in one embodiment.

FIG. 22 is a processing flowchart for describing the step (step 310 in FIG. 11) of setting an air current in the control method of an air conditioner in one embodiment. Each of the steps in FIG. 22 may be performed by the control unit 112 in FIG. 1 (the main control unit 1122 in the case of a control unit similarly configured as illustrated in FIG. 2).

The control unit 112 (the main control unit 1122 in the case of a control unit similarly configured as illustrated in FIG. 2) may determine whether indoor space information is obtained (S311). That is, when the control unit 112 (the main control unit 1122 in the case of a control unit similarly configured as illustrated in FIG. 2) previously obtains an indoor space image and find indoor space information based on the indoor space image, the control unit 112 (the main control unit 1122 in the case of a control unit similarly configured as illustrated in FIG. 2) may store the indoor space information in memory or another storage. Accordingly, the control unit 112 (the main control unit 1122 in the case of a control unit similarly configured as illustrated in FIG. 2) may determine whether the indoor space image is stored in the memory or the storage, to perform step 311.

When there is no indoor space information as a result of the determination in step 311, the control unit 112 (the main control unit 1122 in the case of a control unit similarly configured as illustrated in FIG. 2) may set a current of air being discharged as a basic air current (S312). The basic air current may be an air current that is discharged in the direction in which the air conditioner (an indoor unit 110 in the case of a split air conditioner) faces. In this case, the intensity of the air current may be set to a basic value that is set by the user.

When there is indoor space information as a result of the determination in step 311, the control unit 112 (the main control unit 1122 in the case of a control unit similarly configured as illustrated in FIG. 2) may set a current of air being discharged as the high-speed air current described above (S313). The intensity of the high-speed air current may be set to a maximum value or set based on the size of indoor space (i.e., a distance between the air conditioner and a shortest vertical edge or the surface area of the floor of indoor space), as described above.

Then the control unit 112 (the main control unit 1122 in the case of a control unit similarly configured as illustrated in FIG. 2) may determine whether a temperature difference, which is a difference between a measured temperature that is a measured temperature of indoor space and the target temperature, is a first set temperature or less (S314). The first set temperature may be set to a proper value in advance.

When the temperature difference is greater than the first set temperature as a result of the determination in step 314, the control unit 112 (the main control unit 1122 in the case of a control unit similarly configured as illustrated in FIG. 2) may maintain a current of air being discharged as the high-speed air current (S313).

When the temperature difference is the first set temperature or less as a result of the determination in step 314, the control unit 112 (the main control unit 1122 in the case of a control unit similarly configured as illustrated in FIG. 2) may set a current of air being discharged as the comfortable air current described above (S315).

Then the control unit 112 (the main control unit 1122 in the case of a control unit similarly configured as illustrated in FIG. 2) may determine whether the temperature difference is a second set temperature or greater (S316). In step 316, the control unit may additionally determine whether a duration, for which the temperature difference is the second set temperature or greater, exceeds a predetermined duration. The second set temperature and the predetermined duration may be set to proper values in advance.

When the temperature difference is less than the second set temperature as a result of the determination in step 316, the control unit 112 (the main control unit 1122 in the case of a control unit similarly configured as illustrated in FIG. 2) may maintain a current of air being discharged as the comfortable air current (S315). Depending on embodiments, the control unit 112 (the main control unit 1122 in the case of a control unit similarly configured as illustrated in FIG. 2) may maintain a current of air being discharged as the comfortable air current, when a duration, for which the temperature difference is kept at the second set temperature or greater, is less than the predetermined duration, even if the temperature difference is the second set temperature or greater.

When the temperature difference is the second set temperature or greater as a result of the determination in step 316, the control unit 112 may change a current of air being discharged to the high-speed air current (step 313). Depending on embodiments, the control unit 112 (the main control unit 1122 in the case of a control unit similarly configured as illustrated in FIG. 2) may change a current of air being discharged to the high-speed air current only when the duration, for which the temperature difference is kept at the second set temperature or greater, exceeds the predetermined duration (i.e., when the duration, for which the temperature difference is kept at the second set temperature or greater, is the predetermined duration or greater).

Figure 23:
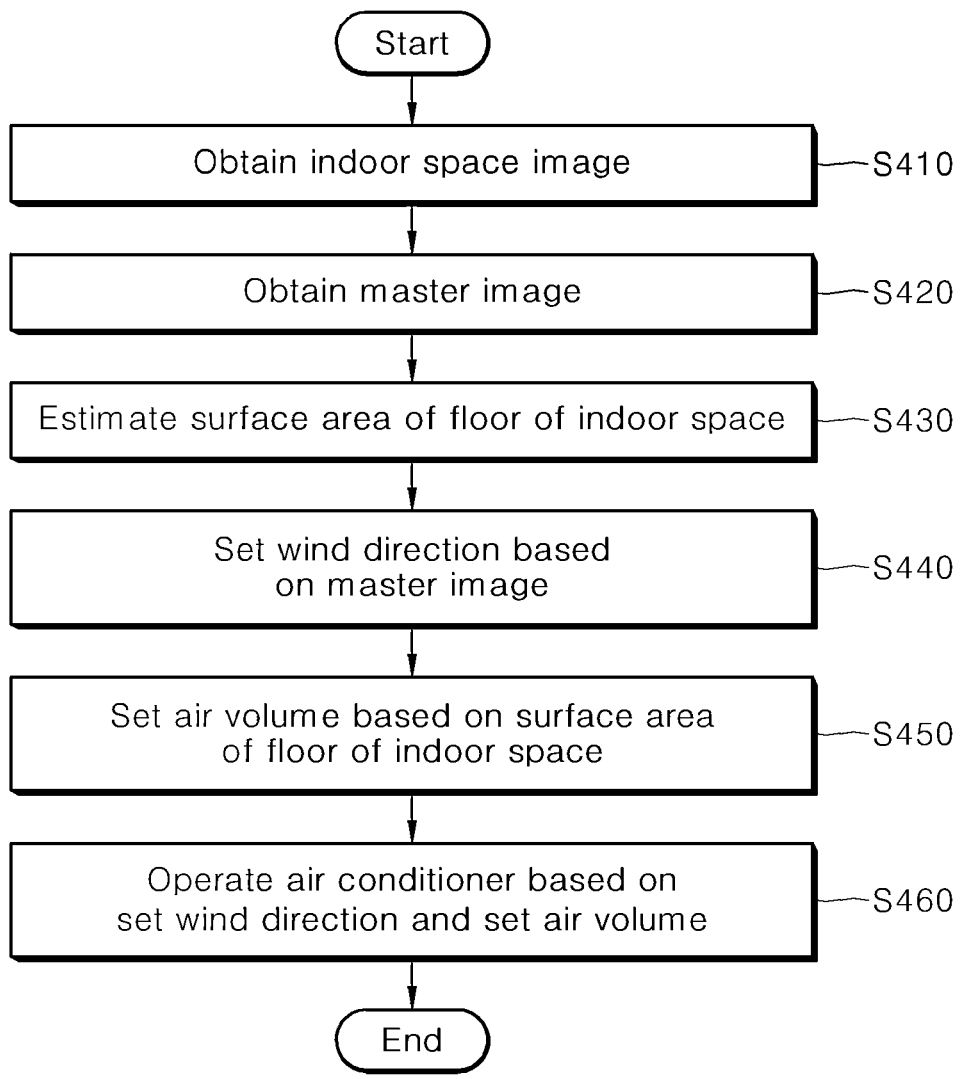
FIG. 23 is a processing flowchart for describing the control method of an air conditioner in one embodiment.

FIG. 23 is a processing flowchart for describing the control method of an air conditioner in one embodiment. Each of the steps in FIG. 23 may be performed by the control unit (112 in FIG. 1).

The control unit 112 may obtain an image of indoor space (S410). The control unit 112 may photograph indoor space where the air conditioner 100 is installed through the camera 111 of the air conditioner 100 and obtain an indoor space image. That is, the camera 111 may obtain a two-dimensional indoor space image by photographing indoor space.

Then the control unit 112 may obtain a master image based on the indoor space image (S420).

Then the control unit 112 may estimate the surface area of the floor of the indoor space (S430).

Step 420 and step 430 can be easily understood with reference to FIGS. 5, 9, 10 and the like.

Depending on embodiments, the control unit 112 may detect a distance each vertical edge and the air conditioner in step 430.

Then the control unit 112 may set a basic still wind direction, based on the master image (S240).

The basic still wind direction may denote a direction in which the indoor unit 110 of the air conditioner 100 discharges air when no instruction is received from the user as the air conditioner 100 starts to operate. The control unit 112 may determine a shortest interwall boundary (a vertical edge) among interwall boundaries included in the master image, and set the direction in which the shortest interwall boundary is positioned to the basic still wind direction.

In this case, the shortest interwall boundary (322 in FIG. 7 in the case of an air conditioner disposed as illustrated in FIG. 6) may be an interwall boundary (a vertical edge) which is farthest from the air conditioner 100 (an indoor unit 110 in the case of a split air conditioner). Since the direction in which the shortest interwall boundary 322 is positioned is set to the basic still wind direction, temperature of indoor space may reach the target temperature more quickly, and uniform temperature may be ensured in the entire indoor space.

Then the control unit 112 may set a basic still air volume, based on the surface area of the floor of indoor space (or a distance between a shortest vertical edge and the air conditioner) (S250). The basic still air volume denotes the amount of air being discharged by the air conditioner 100 (an indoor unit 110 in the case of a split air conditioner) when no instruction is received from the user as the air conditioner 100 starts to operate.

For example, the control unit 112 may calculate a difference between the surface area of the floor of the indoor space (or a distance between the shortest vertical edge and the air conditioner) and a reference surface area for the use of the air conditioner 100 (or any reference value determined based on the cooling capacity of the air conditioner). The reference surface area for the use of the air conditioner 100 (or any reference value determined based on the cooling capacity of the air conditioner) denotes the surface area of indoor space (the length of indoor space) in which the air conditioner 100 can smoothly operate.

The when the difference is a first set value or greater, the control unit 112 may set a first predetermined air volume to the basic still air volume. Additionally, when the difference is less than the first set value and is a second set value or greater, the control unit 112 may set a second predetermined air volume to the basic still air volume. Further, when the difference is less than the second set value, the control unit 122 may set a third predetermined air volume to the basic still air volume.

The first set value may be a reference value at which the air conditioner 100 sets a large air volume to the basic air volume, since the surface area of the floor of indoor space (or the length of indoor space) in which the air conditioner 100 is installed is greater than the reference surface area (or the reference value) for the use of the air conditioner 100.

The second set value may be a reference value at which the air conditioner 100 sets a small air volume to the basic air volume, since the surface area of the floor of indoor space (or the length of indoor space) in which the air conditioner 100 is installed is less than the reference surface area (or the reference value) for the use of the air conditioner 100.

The first air volume, the second air volume and the third air volume may denote the amount of air being discharged by the air conditioner 100, and the first air volume may be greater than the second air volume while the second air volume is greater than the third air volume.

That is, the first air volume may be an air volume at which the air conditioner 100 can discharge air intensely since the surface area of the floor of indoor space (or the length of indoor space) is greater than the reference surface area (or the reference value) for the use of the air conditioner 100. The second air volume may be an air volume at which the air conditioner 100 can moderately discharge air since the surface area of the floor of indoor space (or the length of indoor space) is similar to the reference surface area (or the reference value) for the use of the air conditioner 100. The third air volume may be an air volume at which the air conditioner 100 can mildly discharge air since the surface area of the floor of indoor space (or the length of indoor space) is less than the reference surface area (or the reference value) for the use of the air conditioner 100.

In one embodiment, the first set value may be 2 $m^2$, the second set value may be −2 $m^2$ and the reference surface area for the use of the air conditioner 100 may be 18 $m^2$. In this case, when the surface area of the floor of indoor space is 17.07 $m^2$ as illustrated in FIG. 6, a difference between the surface area of the floor of the indoor space and the reference surface area for the use of the air conditioner 100 is −0.93 $m^2$ that is less than the first set value and is the second set value or greater. Accordingly, the control unit 112 may set the second air volume to the basic still air volume.

In another embodiment, the first set value may be 1 $m^2$, the second set value may be −1 $m^2$ and the reference surface area for the use of the air conditioner 100 may be 15 $m^2$. In this case, when the surface area of the floor of indoor space is 17.07 $m^2$ as illustrated in FIG. 6, a difference between the surface area of the floor of the indoor space and the reference surface area for the use of the air conditioner 100 is 2.07 $m^2$ that is the first set value or greater. Accordingly, the control unit 112 may set the first air volume to the basic still air volume.

In yet another embodiment, the first set value may be 3 m², the second set value may be −3 m² and the reference surface area for the use of the air conditioner 100 may be 25 m². In this case, when the surface area of the floor of indoor space is 17.07 m² as illustrated in FIG. 6, a difference between the surface area of the floor of the indoor space and the reference surface area for the use of the air conditioner 100 is −7.93 m² that is less than the second set value. Accordingly, the control circuit 112 may set the third air volume to the basic still air volume.

The control unit 112, as described above, operates the air conditioner 100 based on the surface area of the floor of the indoor space where the air conditioner 110 (a indoor unit 110 in the case of a split air conditioner) is installed, thereby cooling and heating indoor space where the air conditioner 100 is installed more efficiently.

In one embodiment, the air conditioner 100 is controlled in three stages including the first air volume, the second air volume and the third air volume, and the three stages are classified as a result of comparison of two values such as the first set value and the second set value with a difference between the surface area of the floor of indoor space and the reference surface area for the use of the air conditioner 100, but not limited.

In other words, the control unit 112's adjustment of the air volume of the air conditioner 100 in n+1 stages, based on the n number of set values, is also included in the scope of the present disclosure.

Then the control unit 112 may operate the air conditioner 100, based on the basic still wind direction and the basic still air volume (S460).

Figure 24:
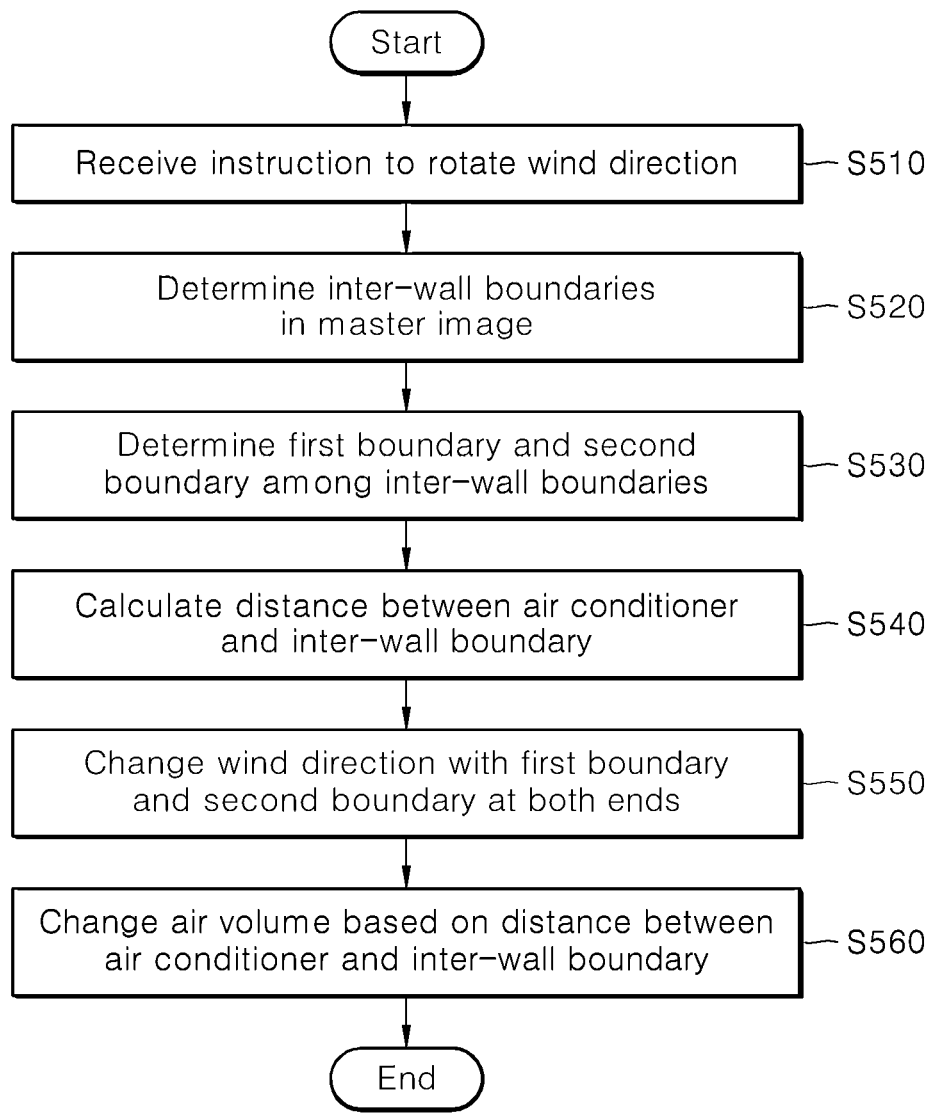
FIG. 24 is a processing flowchart for describing the control method of an air conditioner in one embodiment.

FIG. 24 is a processing flowchart for describing the control method of an air conditioner in one embodiment and for describing the control method of an air conditioner when an instruction to rotate a wind direction is received from the user. Each of the steps in FIG. 24 may be performed by the control unit (112 in FIG. 1).

The control unit 112 may receive an instruction to rotate a wind direction (S510).

Then the control unit 112 may find interwall boundaries (i.e., vertical edges; 321, 322, 323 in FIG. 4) in a master image (S520).

Then the control unit 112 may find a first boundary and a second boundary among the interwall boundaries (i.e., vertical edges; 321, 322, 323 in FIG. 4) (S530). The first boundary may be an interwall boundary (a vertical edge; 321 in FIG. 4) on the leftmost side among the interwall boundaries included in an indoor structure image. The second boundary may be an interwall boundary (a vertical edge; 323 in FIG. 4) on the rightmost side among the interwall boundaries included in the indoor structure image. That is, the control unit 112 may determine the interwall boundary (a vertical edge; 321 in FIG. 4) on the leftmost side as the first boundary, and the interwall boundary (a vertical edge; 323 in FIG. 4) on the rightmost side as the second boundary, in the indoor structure image of FIG. 4, using an algorithm for image processing.

Then the control unit 112 may operate the air conditioner 100 to change a wind direction, with the first boundary and the second boundary at both ends (S550).

For example, when a master image as illustrated in FIG. 7 is obtained by the control unit, in the air conditioner (an indoor unit 110 in the case of a split air conditioner) disposed as illustrated in FIG. 6, the control unit 112 may control the air conditioner 100 such that the air conditioner 100 repeats discharging air from the first boundary 321 to the second boundary 323 and discharging air from the second boundary 323 to the first boundary 321.

Then the control unit 112 may change an air volume depending on a distance between the air conditioner (an indoor unit 110 in the case of a split air conditioner) and an interwall boundary (a vertical edge) (S560).

To this end, the control unit 112 may calculate a distance interwall boundaries (vertical edges) included in the indoor structure image of FIG. 4 and the air conditioner. In this case, the control unit 112 may calculate a distance between the interwall boundaries (vertical edges) and the air conditioner by using a floor structure image that is restored at an actual rate as illustrated in FIG. 6. Alternatively, the control unit 112 may calculate a distance between each vertical edge and the air conditioner based on triangulation. Then the control unit 112 may operate the air conditioner 100 while changing a wind direction with the first boundary and the second boundary at both ends such that an air volume changes based on the calculated distance.

Alternatively, when a master image as illustrated in FIG. 7 is obtained by the control unit, in the air conditioner (an indoor unit 110 in the case of a split air conditioner) disposed as illustrated in FIG. 6, the control unit 112 calculates a distance between the shortest interwall boundary 322 of the interwall boundaries and the air conditioner 100 as the longest distance, and calculates a distance between the first boundary 321 and the air conditioner 100 as the shortest distance. Then the control unit 112 changes an air volume to the largest air volume when discharging air toward the farthest interwall boundary 322, and changes an air volume to a small air volume when discharging air toward the shortest interwall boundary 321.

The control unit 112 may operate the air conditioner 100 to change an air volume, based on a distance between the interwall boundaries 321, 322, 323 and the air conditioner 100, while changing a wind direction with the first boundary 321 and the second boundary 323 at both ends as described above, thereby ensuring uniform temperature in the entire indoor space where the air conditioner 100 is installed.

Depending on embodiments, the control unit 112 may determine initial load elements included in an indoor space image, calculates a total number of the initial load elements and adjust a basic still air volume of the air conditioner 100 based on the total number of the initial load elements, after setting the basic still air volume. In this case, the control unit 112 may determine a window, a curtain a person and the like include in the indoor space image as an initial load element.

Specifically, when the total number of the load elements included in the indoor space image is greater than a first predetermined value, the control unit 112 may adjust the basic still air volume of the air conditioner 100 to a large air volume. When the total number of the load elements included in the indoor space image is less than a second predetermined value, the control unit 112 may adjust the basic still air volume of the air conditioner 100 to a small air volume.

Additionally, the control unit 112 may obtain an indoor space image again by photographing indoor space through the camera 111 while the air conditioner 100 operates, calculate a total number of load elements included in the indoor space image that is photographed during the operation of the air conditioner 100, and adjust the basic still air volume by comparing the total number of the load elements with a total number of initial load elements.

Specifically, the control unit 112 may compare the total number of the load elements, calculated during the operation process, with the total number of the initial load elements. Then when the total number of the load elements increases, the control unit 112 may adjust the basic still air volume to a large air volume, and when the total number of the load elements decreases, adjust the basic still air volume to a small air volume. In this case, when determining the total number of the load elements increases, the control unit 112 may inform the user of the increase in the total number of the load elements.

Figure 25:
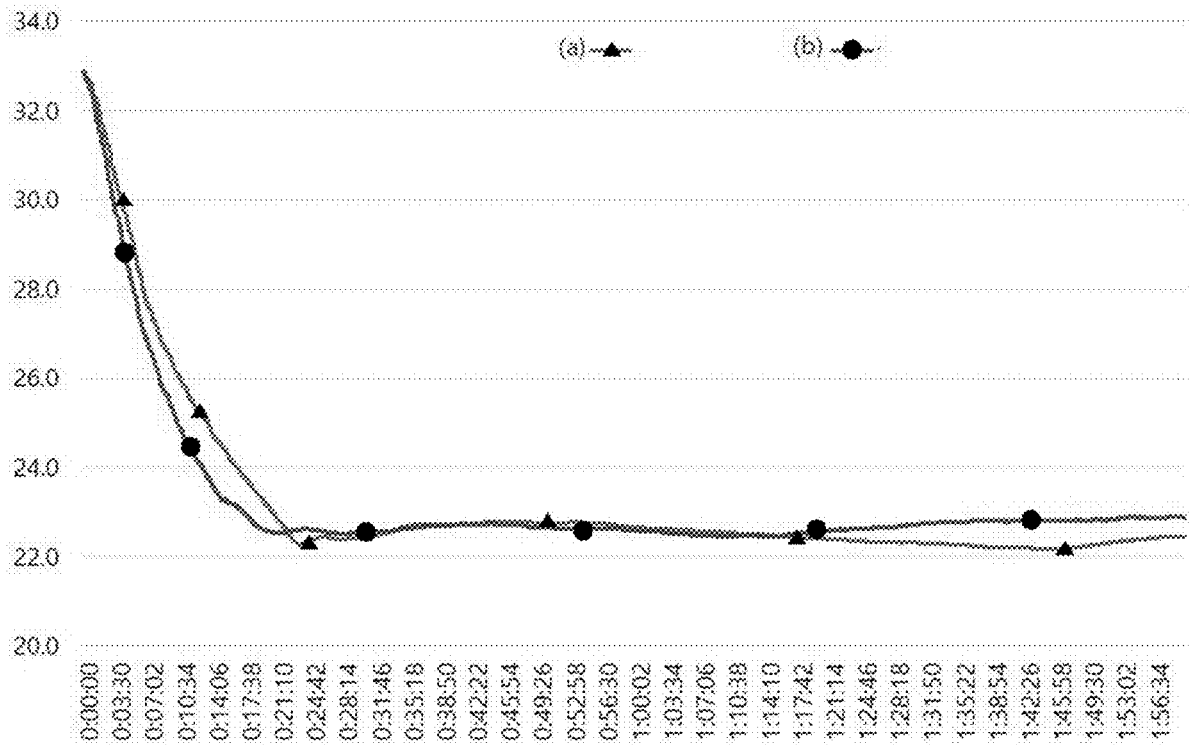
FIG. 25 is a graph showing a change in temperature in one embodiment and a comparative example.

FIG. 25 is a graph showing a change in temperature in one embodiment and a comparative example. FIG. 25(a) shows a change in temperature in the comparative example, and FIG. 25(b) shows a change in temperature in one embodiment. The change in temperature in one embodiment, shown in FIG. 25, denotes a change from the first set temperature of 1.5° C. to the second set temperature of 2° C. in FIG. 22. Additionally, the comparative example in FIG. 25 shows control in the basic air current (step 132) in FIG. 22.

As illustrated in FIG. 25, one embodiment may help indoor temperature to reach target temperature more rapidly than the comparative example. Additionally, indoor temperature in one embodiment may remain more constant than in the comparative example.

Figure 26:
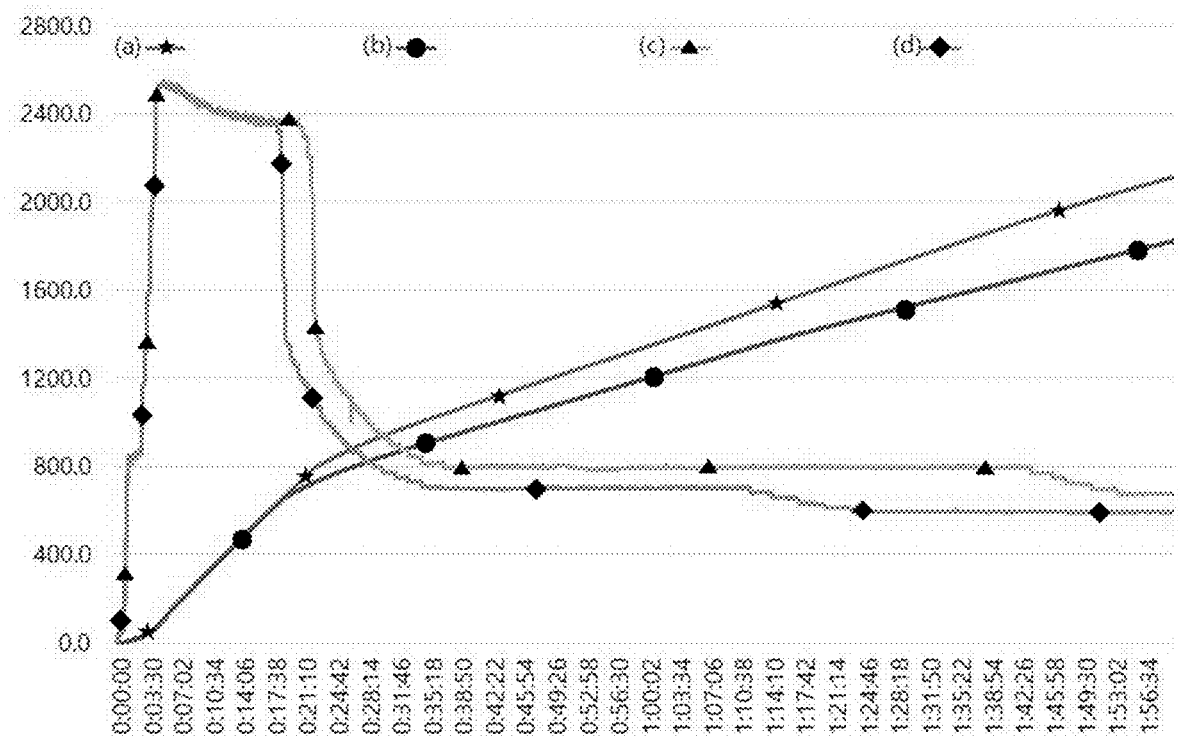
FIG. 26 is a graph showing a change in power in one embodiment and a comparative example.

FIG. 26 is a graph showing a change in power in one embodiment and a comparative example. FIG. 26(a) shows integrated power in the comparative example, FIG. 26(b) shows integrated power in one embodiment, FIG. 26(c) shows instantaneous power in the comparative example, and FIG. 26(d) shows instantaneous power in one embodiment. FIG. 26 shows the change in power in one embodiment at the first set temperature of 1.5° C., and the second set temperature of 2° C. in FIG. 22. Additionally, the comparative example in FIG. 26 shows control in the basic air current (step 132) in FIG. 22.

As illustrated in FIG. 26, consumption of instantaneous power in one embodiment is less than in the comparative example, resulting in integrated power in one embodiment less than in the comparative example, after a predetermined time point passes.

The embodiments are described above with reference to a number of illustrative embodiments thereof. However, embodiments are not limited to the embodiments and drawings set forth herein, and numerous other modifications and embodiments can be devised by one skilled in the art within the technical scope of the disclosure. Further, the effects and predictable effects based on the configurations in the disclosure are to be included within the range of the disclosure though not explicitly described in the description of the embodiments.

The invention claimed is:

1. An air conditioner, comprising:
a camera configured to capture an image of indoor space; and
a control unit configured to:
determine indoor space information based on the image of the indoor space, and
control at least one of a wind direction or an air volume of air being discharged into the indoor space by the air conditioner based on the indoor space information,
wherein the indoor space information comprises a position of at least one vertical edge that is an interwall boundary in the indoor space, and
wherein the control unit:
estimates a surface area of a floor of the indoor space, based on the image of the indoor space,
calculates a difference between the surface area of the floor of the indoor space and a reference surface area for use of the air conditioner,
sets a first predetermined air volume to a basic still air volume when the difference is a first set value or greater,
sets a second predetermined air volume to the basic still air volume when the difference is less than the first set value and is a second set value or greater, and
sets a third predetermined air volume to the basic still air volume when the difference is less than the second set value.

2. The air conditioner of claim 1, wherein the control unit controls the wind direction based on the position of the at least one vertical edge.

3. The air conditioner of claim 1, wherein
the indoor space information comprises a distance between the at least one vertical edge and the air conditioner, and
the control unit controls the air volume based on the distance between the at least one vertical edge and the air conditioner.

4. The air conditioner of claim 1, wherein the control unit obtains a master image comprising the at least one vertical edge in the indoor space, an upper transverse edge that is a boundary between a wall and a ceiling in the indoor space, and a lower transverse edge that is a boundary between a wall and the floor in the indoor space, based on the image of the indoor space, and
determines the indoor space information based on the master image.

5. The air conditioner of claim 1, wherein
the control unit
sets a high speed air current in which air is discharged toward a farthest vertical edge among the at least one vertical edge, sets a comfortable air current in which air is discharged in a first direction further leftward than a direction in which air in the high-speed air current is discharged and in a second direction further rightward than the direction in which air in the high-speed air current is discharged, and
controls the air conditioner to discharge air in at least one of the high-speed air current or the comfortable air current.

6. The air conditioner of claim 5, wherein, when the air conditioner is discharging air in the high-speed air current, the control unit controls the air conditioner to stop discharging air in the high-speed air current and to discharge air in the comfortable air current, when a difference between a temperature of the indoor space and a target temperature is a first set temperature difference or less.

7. The air conditioner of claim 5, wherein, when the air conditioner is discharging air in the comfortable air current, the control unit controls the air conditioner to stop discharging air in the comfortable air current and to discharge air in the high-speed air current, when a difference between a temperature of the indoor space and a target temperature is a second set temperature difference or greater.

8. The air conditioner of claim 1, wherein
the control unit controls the wind direction such that air is discharged toward a shortest vertical edge among the at least one vertical edge, when the air conditioner starts to operate.

9. The air conditioner of claim 8, wherein
the indoor space information further comprises information on a surface area of the indoor space, and
the control unit controls the air volume based on the surface area of the indoor space.

10. The air conditioner of claim 8, wherein
the indoor space information comprises a first boundary on a right side of the shortest vertical edge, and a second boundary on a left side of the shortest vertical edge, and
the control unit controls the wind direction to rotate between the first boundary and the second boundary based on receiving an instruction to rotate the wind direction.

11. A control method of an air conditioner, comprising:
obtaining, by the air conditioner, an image of an indoor space;
determining, by the air conditioner, indoor space information based on the image of the indoor space; and
controlling, by the air conditioner, at least one of a direction or an amount of air being discharged by the air conditioner into the indoor space based on the indoor space information,
wherein the indoor space information comprises a position of at least one vertical edge that is an interwall boundary in the indoor space, and
wherein the control unit
estimates a surface area of a floor of the indoor space, based on the image of the indoor space,
calculates a difference between the surface area of the floor of the indoor space and a reference surface area for use of the air conditioner,
sets a first predetermined air volume to a basic still air volume when the difference is a first set value or greater,
sets a second predetermined air volume to the basic still air volume when the difference is less than the first set value and is a second set value or greater, and
sets a third predetermined air volume to the basic still air volume when the difference is less than the second set value.

12. The control method of claim 11, wherein the controlling of the at least one of the direction or the amount of air being discharged comprises controlling the direction of air being discharged based on the position of the at least one vertical edge.

13. The control method of claim 11, wherein
the indoor space information comprises a distance between the at least one vertical edge and the air conditioner, and
the controlling of the at least one of the direction or the amount of air being discharged comprises controlling the amount of air being discharged based on the distance.

14. The control method of claim 11, wherein the determining of the indoor space information based on the image of the indoor space comprises:
obtaining a master image comprising the at least one vertical edge in the indoor space, an upper transverse edge that is a boundary between a wall and a ceiling in the indoor space, and a lower transverse edge that is a boundary between a wall and the floor in the indoor space, based on the image of the indoor space; and
determining the indoor space information based on the master image.

15. The control method of claim 11, wherein the controlling of the at least one of the direction or the amount of air being discharged comprises:
setting a high-seed air current in which air is discharged toward a farthest vertical edge among the at least one vertical edge, and setting a comfortable air current in which air is discharged in a first direction further leftward than a direction in which air in the high-speed air current is discharged and in a second direction further rightward than the direction in which air in the high-speed air current is discharged; and
controlling the air conditioner to discharge air in one of the high-speed air current or the comfortable air current.

16. The control method of claim 15, the controlling of the at least one of the direction or the amount of air being discharged by the air conditioner comprises:
controlling the air conditioner to discharge air in the high-speed air current during a time period; and
changing an air current of air being discharged from the high-speed air current to the comfortable air current after the time period, when a difference between a temperature of the indoor space and a target temperature is a first set temperature difference or less.

17. The control method of claim 15, the controlling of the at least one of the direction or the amount of air being discharged by the air conditioner comprises:
controlling the air conditioner to discharge air in the comfortable air current during a time period; and
changing the air current being discharged from the comfortable air current to the high-speed air current after the time period, when a difference between a temperature of the indoor space and a target temperature is a second set temperature difference or greater.

18. The control method of claim 11, wherein the controlling of the at least one of the direction or the amount of air being discharged comprises controlling the air condition to discharge air toward a shortest vertical edge among the at least one vertical edge when the air conditioner starts to operate.

19. The control method of claim 18, wherein
the determining of the indoor space information further comprises finding information on a surface area of the indoor space based on the image of the indoor space, and
the controlling of the at least one of the direction or the amount of air being discharged comprises controlling the amount of air being discharged based on the surface area of the indoor space.

20. The control method of claim 18, wherein
the determining of the indoor space information further comprises finding a first boundary on a right side of the shortest vertical edge, and a second boundary on a left side of the shortest vertical edge, and
the controlling of the at least one of the direction or the amount of air being discharged comprises rotating the direction of air being discharged between the first boundary and the second boundary, when an instruction to rotate the direction of air being discharged is received.

* * * * *